United States Patent
Chalmers et al.

(10) Patent No.: US 6,172,756 B1
(45) Date of Patent: Jan. 9, 2001

(54) RAPID AND ACCURATE END POINT DETECTION IN A NOISY ENVIRONMENT

(75) Inventors: Scott A. Chalmers, La Jolla; Randall S. Geels, San Diego, both of CA (US)

(73) Assignee: Filmetrics, Inc., San Diego, CA (US)

(*) Notice: Under 35 U.S.C. 154(b), the term of this patent shall be extended for 0 days.

(21) Appl. No.: 09/210,140

(22) Filed: Dec. 11, 1998

(51) Int. Cl.[7] ............ G01B 11/02; B24B 49/00
(52) U.S. Cl. ............ 356/381; 356/382; 451/6
(58) Field of Search ............ 356/381, 382; 451/5, 6

(56) References Cited

U.S. PATENT DOCUMENTS

| | | |
|---|---|---|
| 3,880,524 | 4/1975 | Dill et al. . |
| 3,985,447 | 10/1976 | Aspnes . |
| 4,555,767 | 11/1985 | Case et al. . |
| 4,948,259 | 8/1990 | Enke et al. . |
| 4,984,894 | 1/1991 | Kondo . |
| 5,227,861 | 7/1993 | Nishizawa et al. . |
| 5,337,150 | 8/1994 | Mumola . |
| 5,416,594 | 5/1995 | Gross et al. . |
| 5,450,205 | 9/1995 | Sawin et al. . |
| 5,587,792 | 12/1996 | Nishizawa et al. . |
| 5,642,196 | 6/1997 | Alves et al. . |
| 5,643,044 | 7/1997 | Lund . |
| 5,646,734 | 7/1997 | Venkatesh et al. . |
| 5,658,183 | 8/1997 | Sandhu et al. . |
| 5,663,797 | 9/1997 | Sandhu . |
| 5,667,424 | 9/1997 | Pan . |
| 5,685,766 | 11/1997 | Mattingly et al. . |
| 5,949,927 | * 9/1999 | Tang ................... 385/12 |

FOREIGN PATENT DOCUMENTS

| | | |
|---|---|---|
| 0 644 399 A2 | 3/1995 | (EP) . |
| 0 663 265 A1 | 7/1995 | (EP) . |

OTHER PUBLICATIONS

William H. Press et al., "The Art of Scientific Computing," *Numerical Recipes in C*, Cambridge University Press (Second Edition), Chapters 12 and 13.

Jones, G.R. et al., *Chromatic Interferometry for a Intelligent Plasma Processing System*, Measurement Science & Technology, vol. 5, No. 6, Jun. 1994 (1994–06), Pp. 639–647, XP 000456344; Bristol, GB.

Lange, V. et al., *Reflexionsinterferometrie zur Kontrolle dünner Silizium–Membranen*, Technisches Messen, vol. 61, No. 9, Sep., 1994 (1994–09), p. 346–351, XP000465894, pp. 346–351, figures 1–4.

* cited by examiner

Primary Examiner—Frank G. Font
Assistant Examiner—Zandra V. Smith
(74) Attorney, Agent, or Firm—Howrey Simon Arnold & White, LLP; Robert C. Laurenson

(57) ABSTRACT

Methods and apparatus for film measurement and endpoint detection in a noisy environment, such as CMP processing of semiconductor wafers, are disclosed, characterized by the use of spectral analysis of intensity data derived from light reflected off the sample to estimate film thickness or detect an endpoint condition.

15 Claims, 23 Drawing Sheets

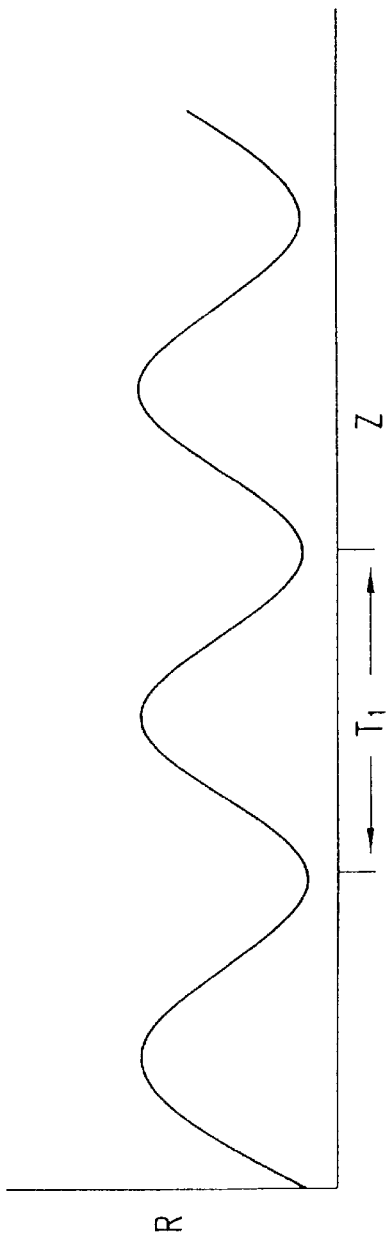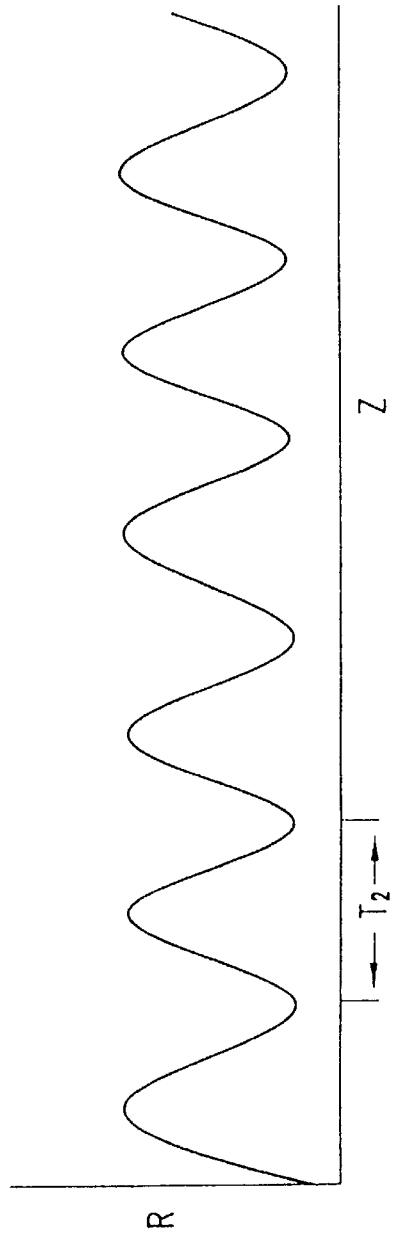

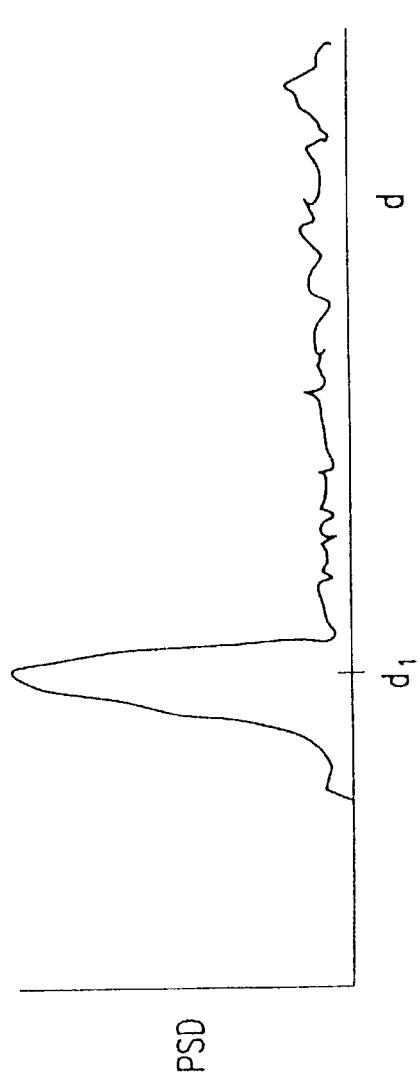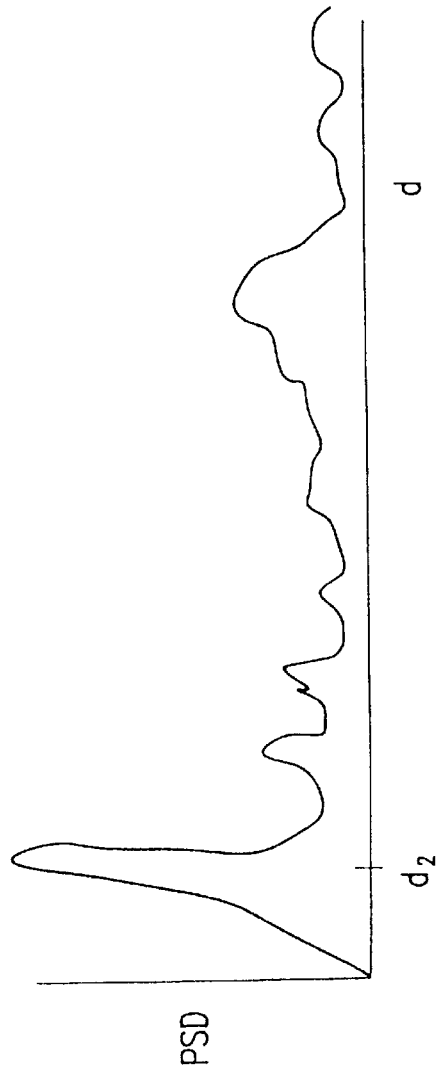

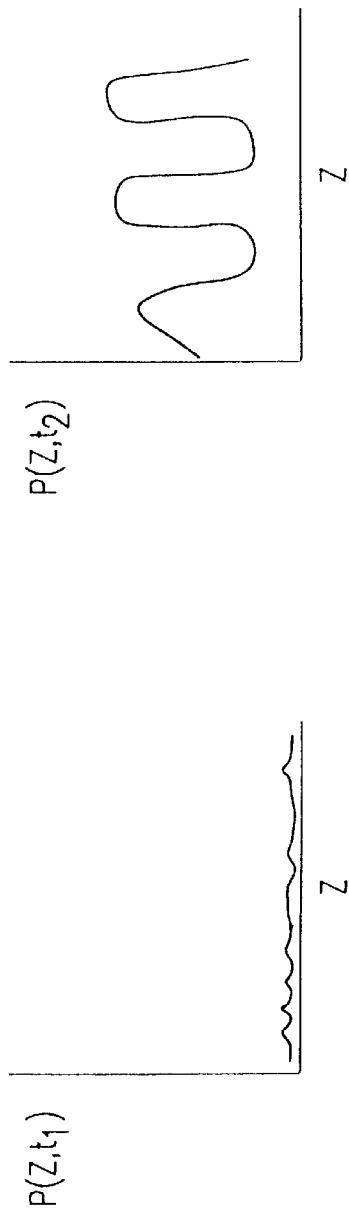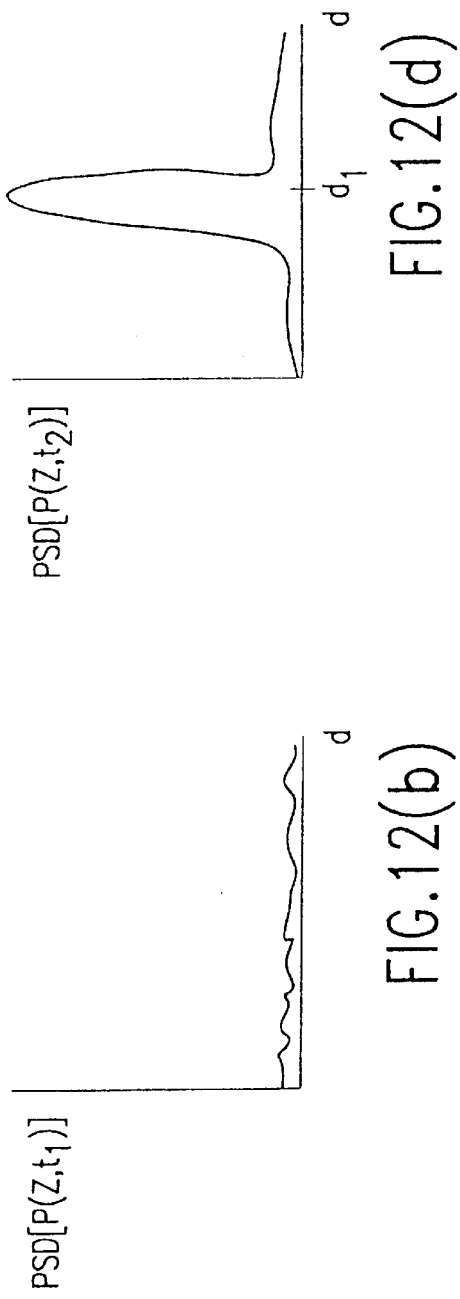
FIG.12(a) FIG.12(b) FIG.12(c) FIG.12(d)

FIG. 18

RAPID AND ACCURATE END POINT DETECTION IN A NOISY ENVIRONMENT

I. BACKGROUND OF THE INVENTION

This invention relates generally to the field of film thickness measurement and film etching and deposition end point detection, and more specifically, to the field of film measurement and end point detection in a noisy environment, such as CMP processing of semiconductor wafers.

Many industrial processes require precise control of film thickness. In semiconductor processing, for example, a semiconductor wafer is fabricated in which one or more layers of material from the group comprising metals, metal oxides, insulators, silicon dioxide ($SiO_2$), silicon nitride (SiN), polysilicon or the like, are stacked on top of one another over a substrate, made of a material such as silicon. Often, these layers are added through a subtractive process in which a layer having a thickness greater than the desired thickness is added to the previous layer, and then polished or ground down to the desired thickness through a process known as chemical mechanical planarization (CMP). The level of precision which is required can range from 0.001 μm (a few atoms) to 100 μm (about the thickness of a human hair).

With reference to FIG. 1, a CMP station 1 is illustrated. The station comprises upper platen or pallet 2 and lower platen or pallet 6 configured to move relative to one another. In the specific example illustrated in the figure, platen or pallet 2 is configured to axially move in a counter-clockwise direction relative to platen or pallet 6, and pallet 6 is configured to move horizontally or longitudinally relative to pallet 2. The upper pallet 2 has a mount 3 for fixably mounting semiconductor wafer 4. The lower pallet 6 is configured with a polishing pad 5, which in operation comes into contact with a layer 4a on the underside of wafer 4. A means 7 is provided for delivering a slurry to the upper surface 5a of the polishing pad 5. As shown, the delivery means includes one or more channels, one of which is identified in the figure with identifying numeral 7a, for delivering the slurry to the upper face 5a of the polishing pad. The slurry facilitates polishing of the wafer face, and typically comprises an abrasive chemical composition such as an ultra-fine grit formed of solid alumina or silica particles in a solution.

In operation, the upper and lower platens are moved relative to one another such that the upper surface of the polishing pad 5a frictionally engages the lower surface of the layer 4a of the wafer 4 while slurry is delivered to the upper surface of the polishing pad 5a through means 7. Through this procedure, polishing of the lower surface of layer 4a is accomplished. A mechanism (not shown) is provided to monitor the thickness of the layer 4a. This mechanism is used to control the CMP station so that the thickness of the layer 4a is not reduced below the desired thickness through excessive polishing. Exemplary embodiments of CMP stations configured to polish the surfaces of semiconductor wafers are described in U.S. Pat. Nos. 5,667,424; 5,663,797; 5,658,183; and 5,643,044, each of which is hereby incorporated by reference herein as though set forth in full.

In CMP processing, it is necessary to periodically if not continuously monitor film thickness in order to ensure that the thickness is not reduced below the desired amount though excessive polishing. Optical methods for monitoring film thickness in applications such as CMP have been proposed. According to such methods, an estimate of film thickness is derived through suitable analysis of light reflected from the surface of the film.

A problem with such methods as applied to CMP is that the monitoring of the film thickness cannot typically be done in in situ, i.e., while chemical mechanical planarization of the wafer is underway. The reason is that the slurry introduces a distortion into the reflected light, making it difficult if not impossible to accurately measure film thickness.

The problem is illustrated in FIG. 2, in which, compared to FIG. 1, like elements are identified with like identifying numerals. As shown, a slurry 8 is interposed between the lower surface of film 4a, and the upper surface 5a of polishing pad 5. Light 9 is directed to the film 4a for the purpose of measuring the thickness of the film. The reflected light 10 which ensues is captured and analyzed. As can be seen, the light 10 passes through the slurry 8. This process introduces distortion or noise into the light 10.

Consequently, the CMP procedure must typically be halted and the slurry removed from the film 4a in order to allow for accurate measurement of film thickness. Since monitoring of film thickness must be performed periodically if not continuously, the overhead involved in repeatedly stopping the CMP procedure, and removing the slurry, can be prohibitively expensive in terms of reduced throughput of the CMP procedure. In many cases, this renders the optical method of film measurement infeasible for application to CMP because of the overhead involved.

Another problem with such approaches is that distortion introduced by the optical components of the film measuring apparatus can adversely impact the accuracy of film thickness measurement. With reference to FIG. 2, each of the optical components involved in directing light 9 to the film 4a, and in capturing and analyzing the reflected beam 10, can introduce such a distortion into the reflected light 10.

Optical methods for film thickness measurement have been proposed which employ spectral or Fourier analysis of the light reflected from the film. Representative examples of such methods are described in U.S. Pat. Nos. 5,646,734; 5,642,196; 5,587,792; 5,227,861; 4,984,894; 4,555,767; 3,985,447; and 3,880,524. However, such methods are computationally complex, require time-consuming comparisons with theoretical or expected waveforms, employ excessive numbers of analytical steps to determine film thickness, or require time-consuming angular and mechanical movements or sweeps of an optical device such as a mirror. Consequently, in many cases, the process of monitoring film thickness employing such methods cannot be performed in real time, i.e., concurrently with and without requiring stoppage of CMP processing. In such cases, the rate of CMP processing must be slowed down to permit film monitoring. The result is a reduced throughput of CMP processing.

Accordingly, it is an object of the present invention to provide a method and apparatus for achieving rapid and accurate thin film measurement and end point detection in a noisy environment.

Another object is a method and apparatus for thin film processing which permits in situ monitoring of film thickness and end point detection during CMP processing.

Another object is an optical method and apparatus for thin film measurement and end point detection during CMP processing which provides for accurate measurement of film thickness despite distortion introduced by the slurry.

A further object is an optical method and apparatus for thin film measurement and end point detection which allows for accurate measurement of film thickness despite distortion introduced by the optical components thereof.

Another object is an optical method and apparatus for thin film measurement and end point detection which is capable of being operated in real-time during CMP processing.

A further object is an optical method and apparatus for thin measurement and end point detection which overcomes the disadvantages of the prior art.

Further objects of the subject invention include utilization or achievement of the foregoing objects, alone or in combination. Additional objects and advantages will be set forth in the description which follows, or will be apparent to those of ordinary skill in the art who practice the invention.

II. RELATED APPLICATIONS

The following co-pending U.S. patent applications, each of which is filed on even date herewith and has a common assignee with the subject application, are each hereby incorporated by reference herein as though set forth in full: 1.) "RAPID AND ACCURATE THIN FILM MEASUREMENT IN A NOISY ENVIRONMENT," Lyon & Lyon Dkt. No. 236/138; 2.) "SPECTROMETER CONFIGURED TO PROVIDE SIMULTANEOUS MULTIPLE INTENSITY SPECTRA FROM INDEPENDENT LIGHT SOURCES," Lyon & Lyon Dkt. No. 239/003; and 3.) "RAPID AND ACCURATE THIN FILM MEASUREMENT OF INDIVIDUAL LAYERS IN A MULTI-LAYERED OR PATTERNED SAMPLE," Lyon & Lyon Dkt. No. 239/002.

III. SUMMARY OF THE INVENTION

To achieve the foregoing objects, and in accordance with the purpose of the invention as embodied and broadly described herein, there is provided a method for detecting an endpoint condition for at least one film included within a sample from light reflected from the sample having a plurality of wavelength components, each having an intensity, the method comprising the following steps: obtaining data representative of the intensity of at least some of said wavelength components; performing spectral analysis on the data to obtain thickness spectral data as a function of potential layer thickness; integrating the spectral data over potential layer thickness to obtain an endpoint parameter; detecting a transition in the endpoint parameter; and detecting the endpoint condition from the transition.

Related apparatus and computer readable media are also provided.

IV. BRIEF DESCRIPTION OF THE DRAWINGS

Figure 3:
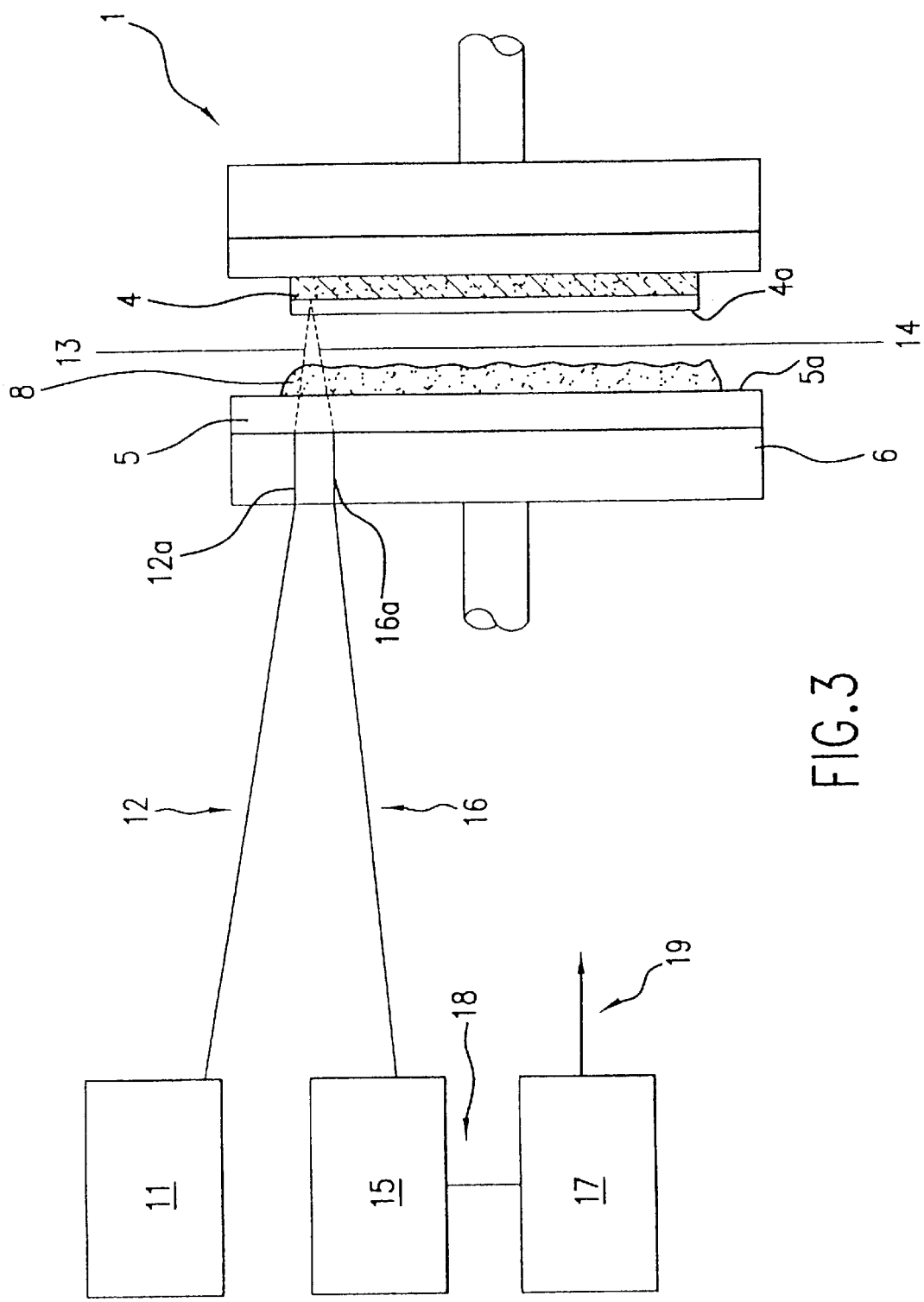
FIG. 3 illustrates a first embodiment of an apparatus of the subject invention.
Figure 7:
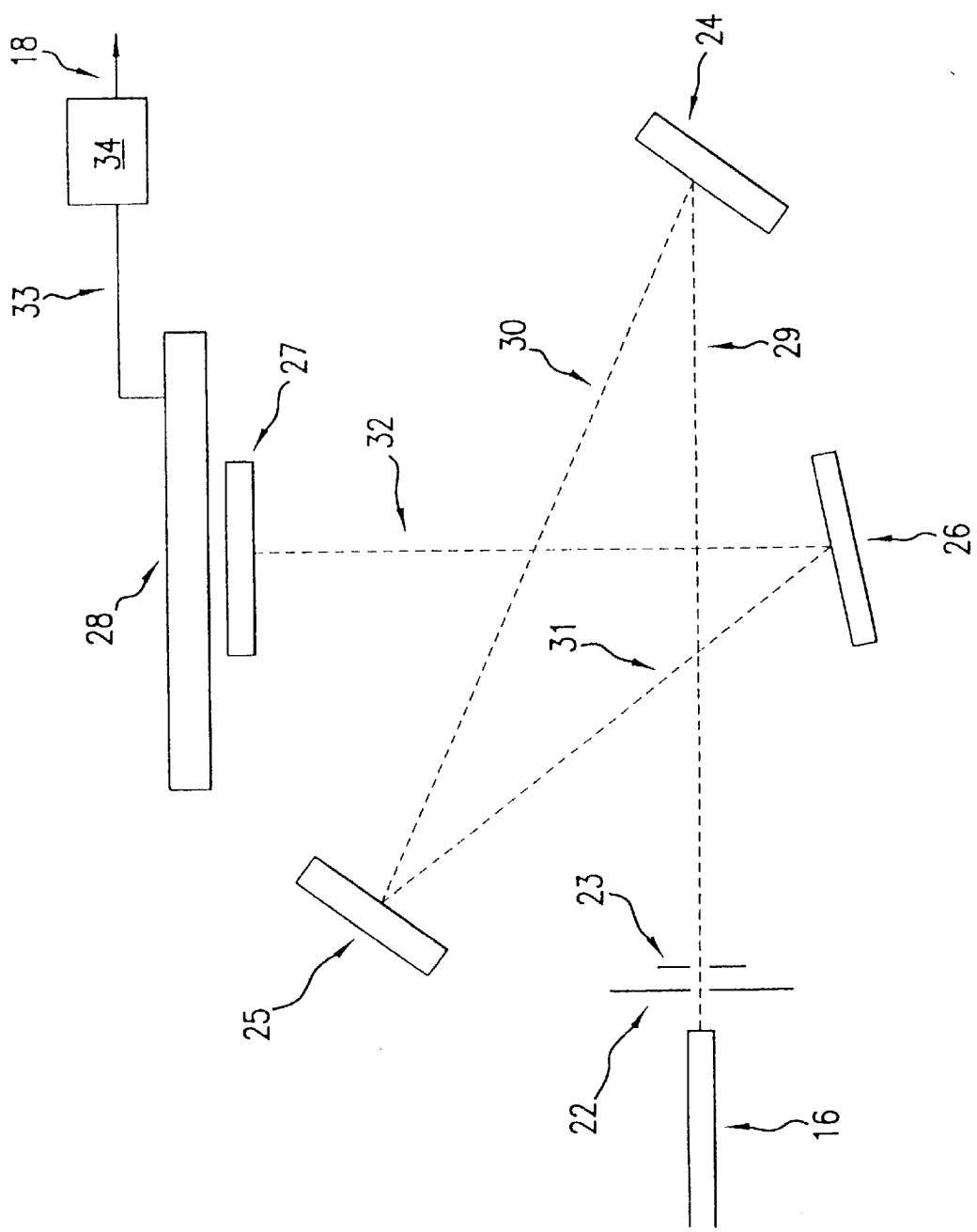
Figure 8:
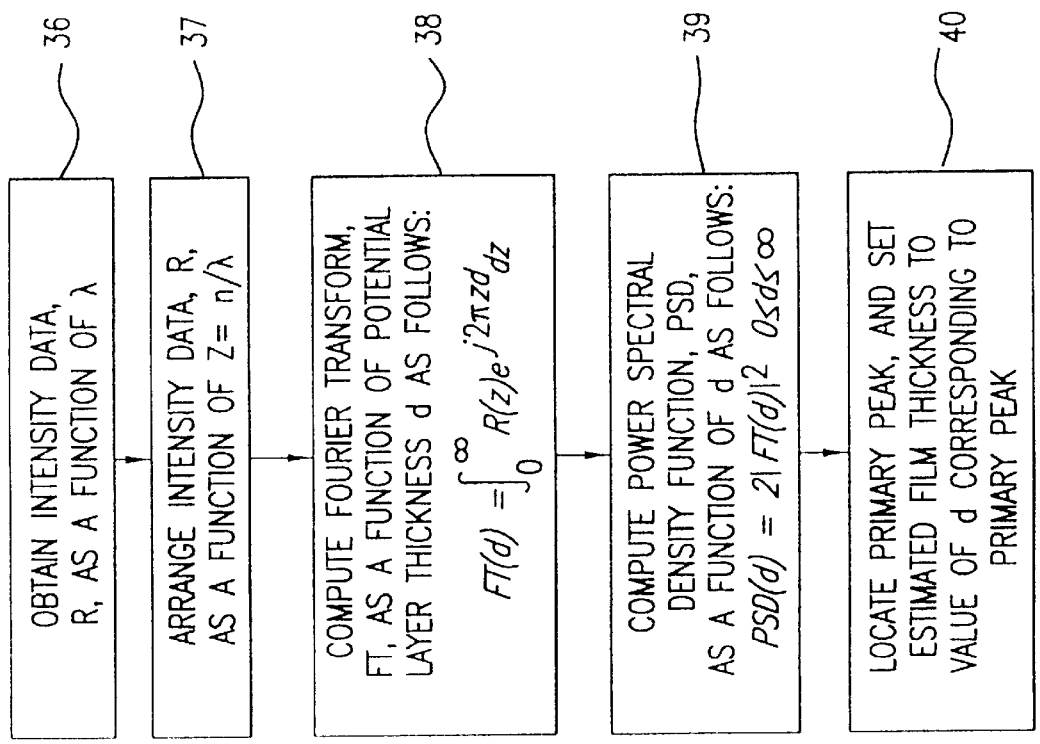
Figure 10A:
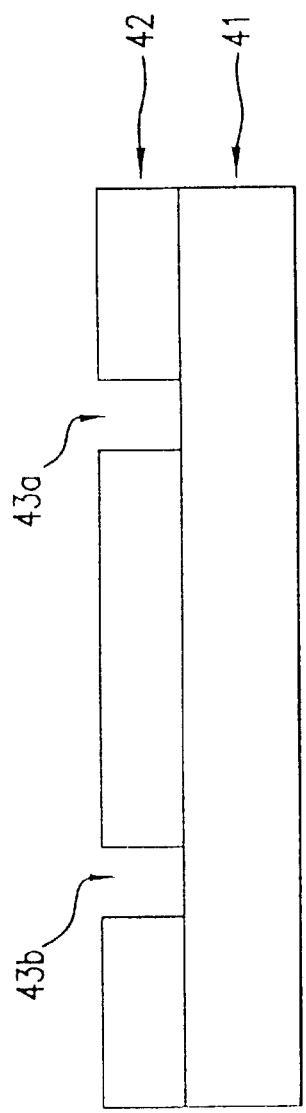
Figure 10B:
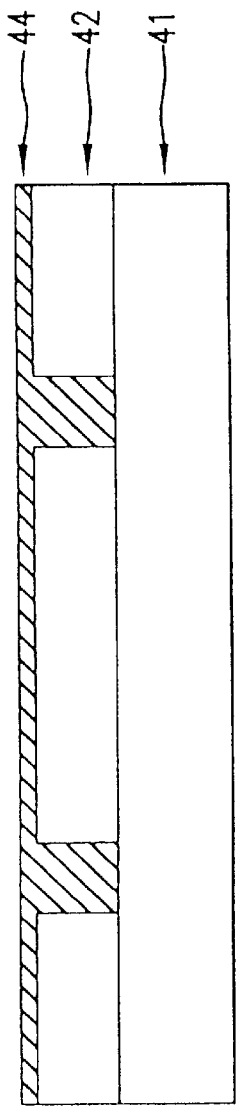
Figure 10C:
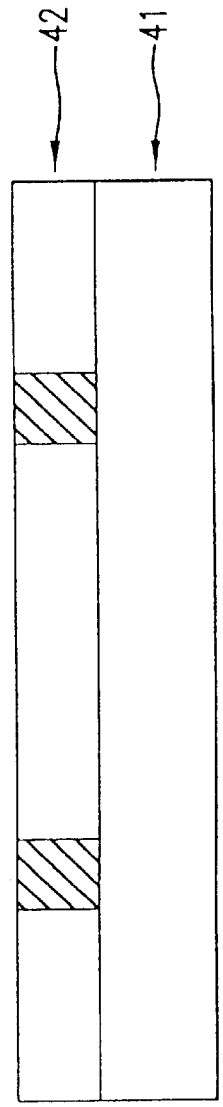
Figure 11A:
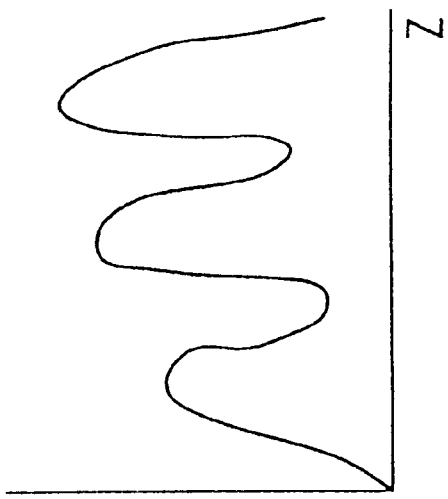
Figure 11B:
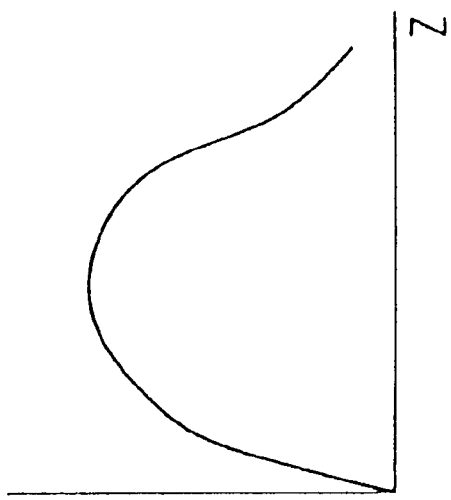
Figure 13:
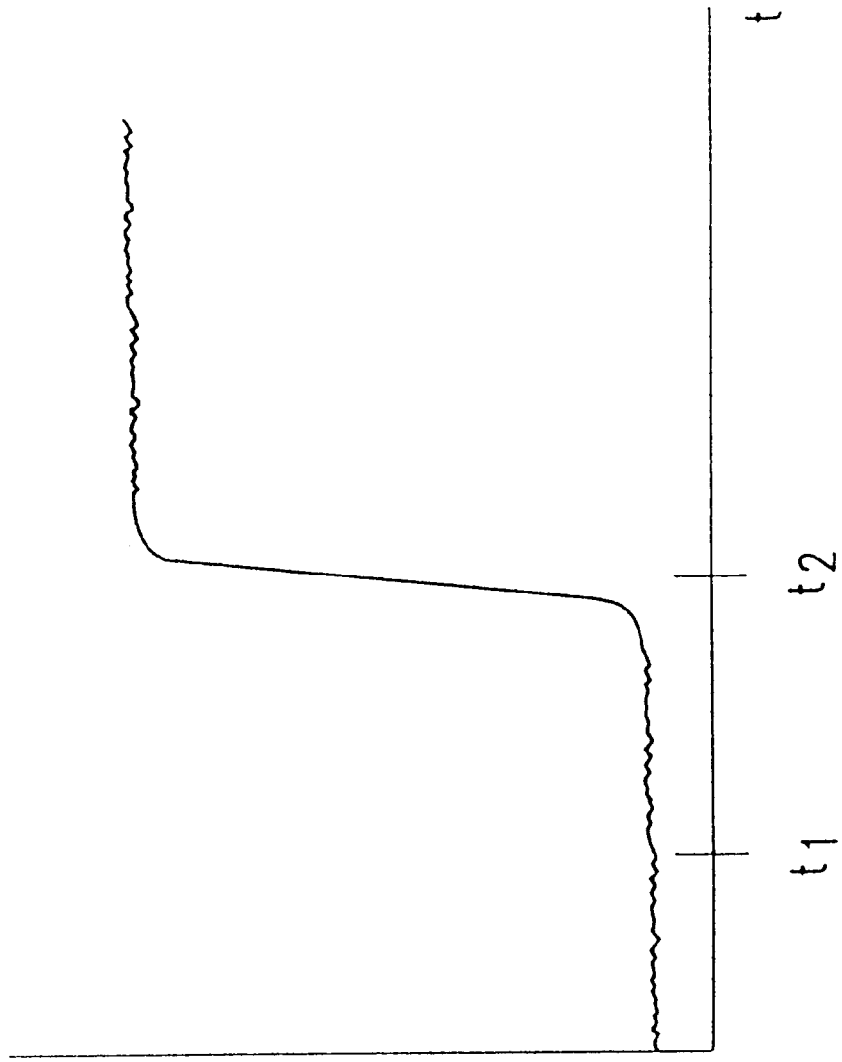
Figure 14:
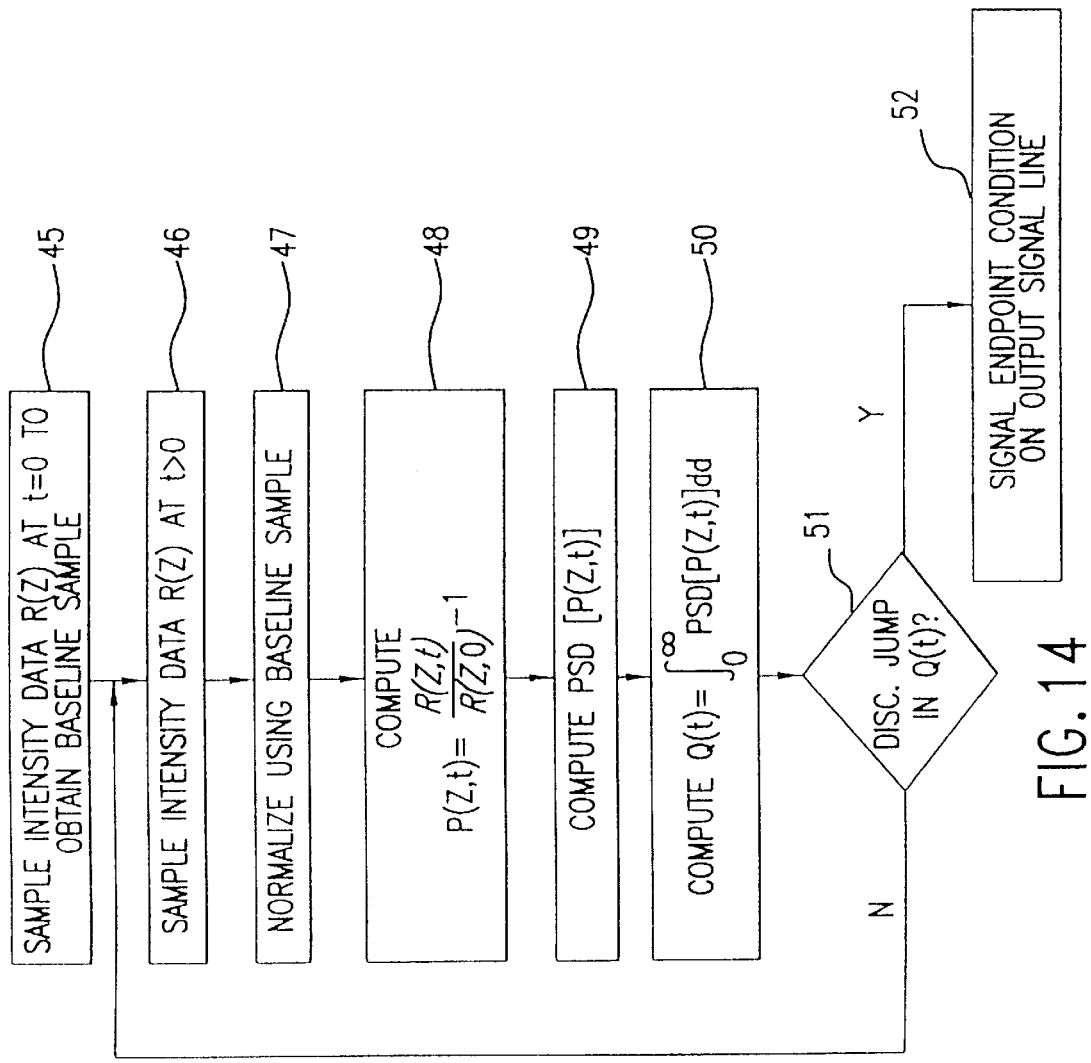
Figure 15:
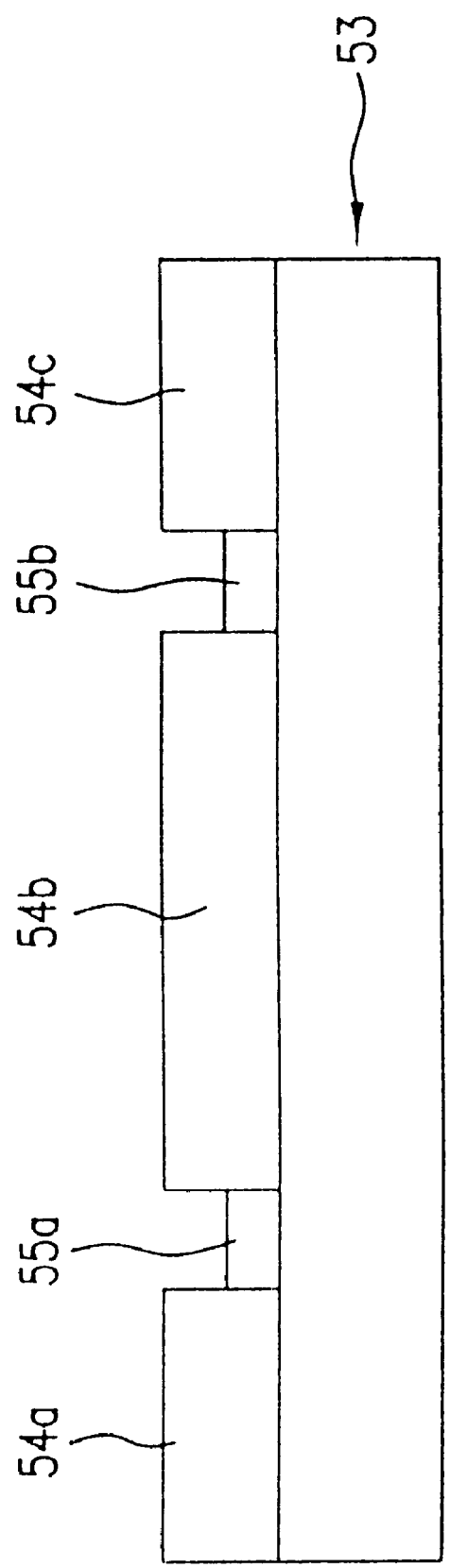
Figure 16A:
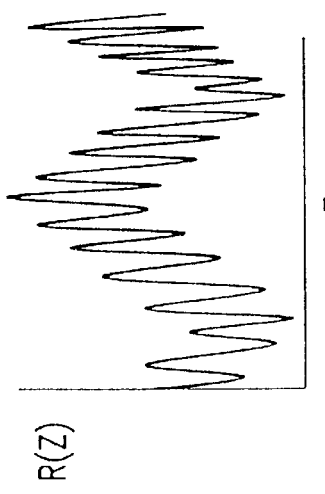
Figure 16C:
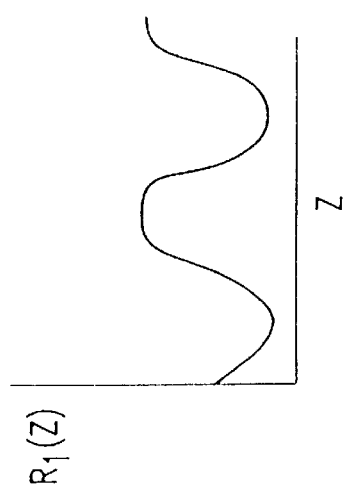
Figure 16B:
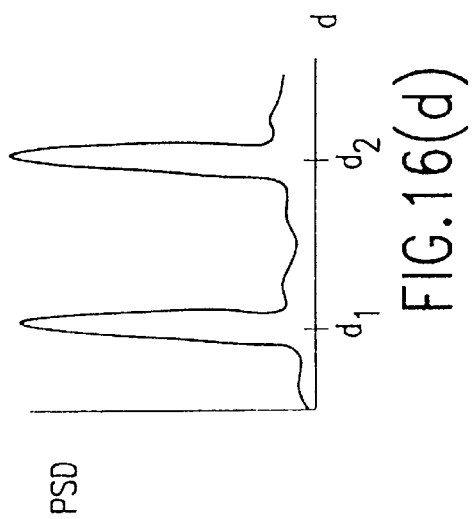
Figure 16D:
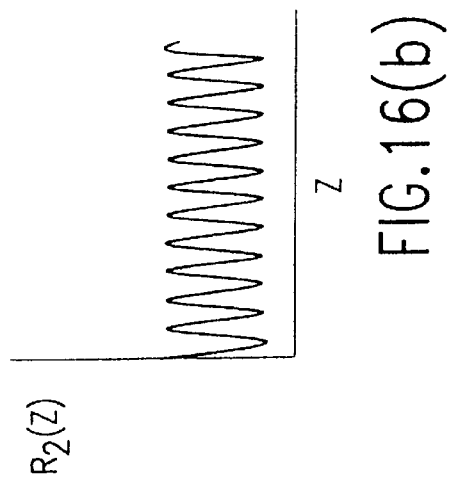
Figure 17:
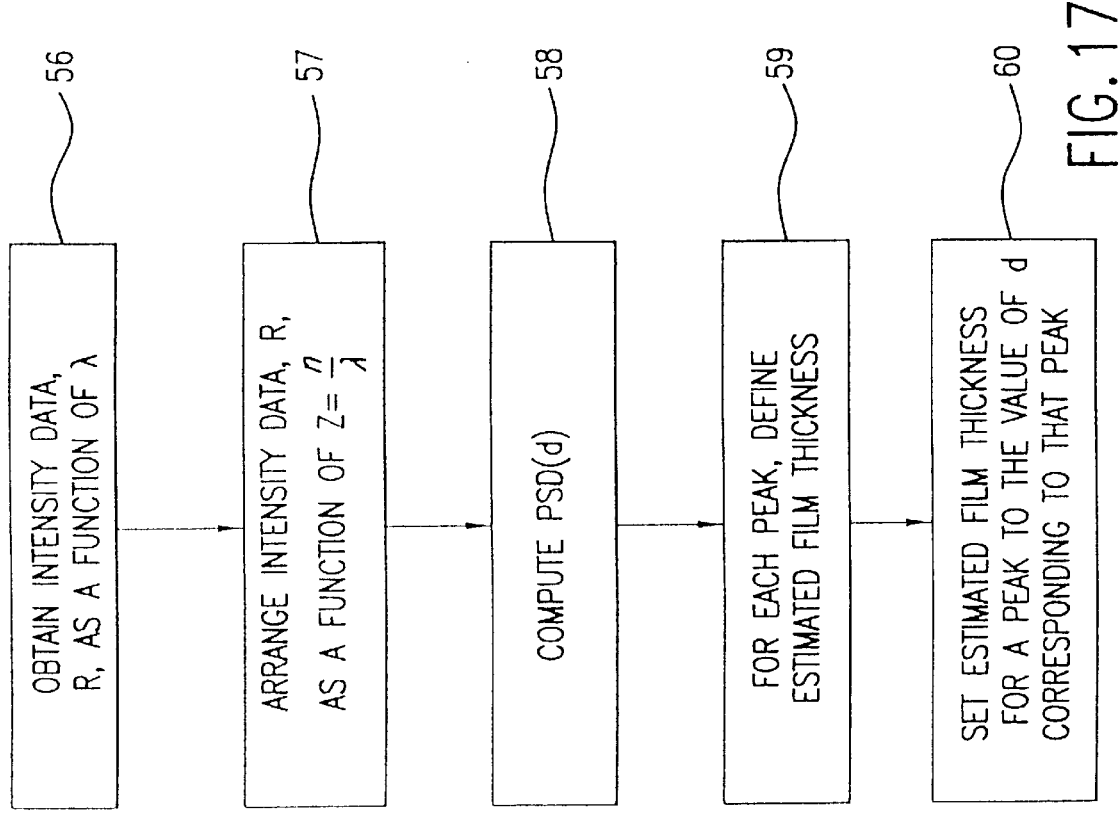
Figure 19A:
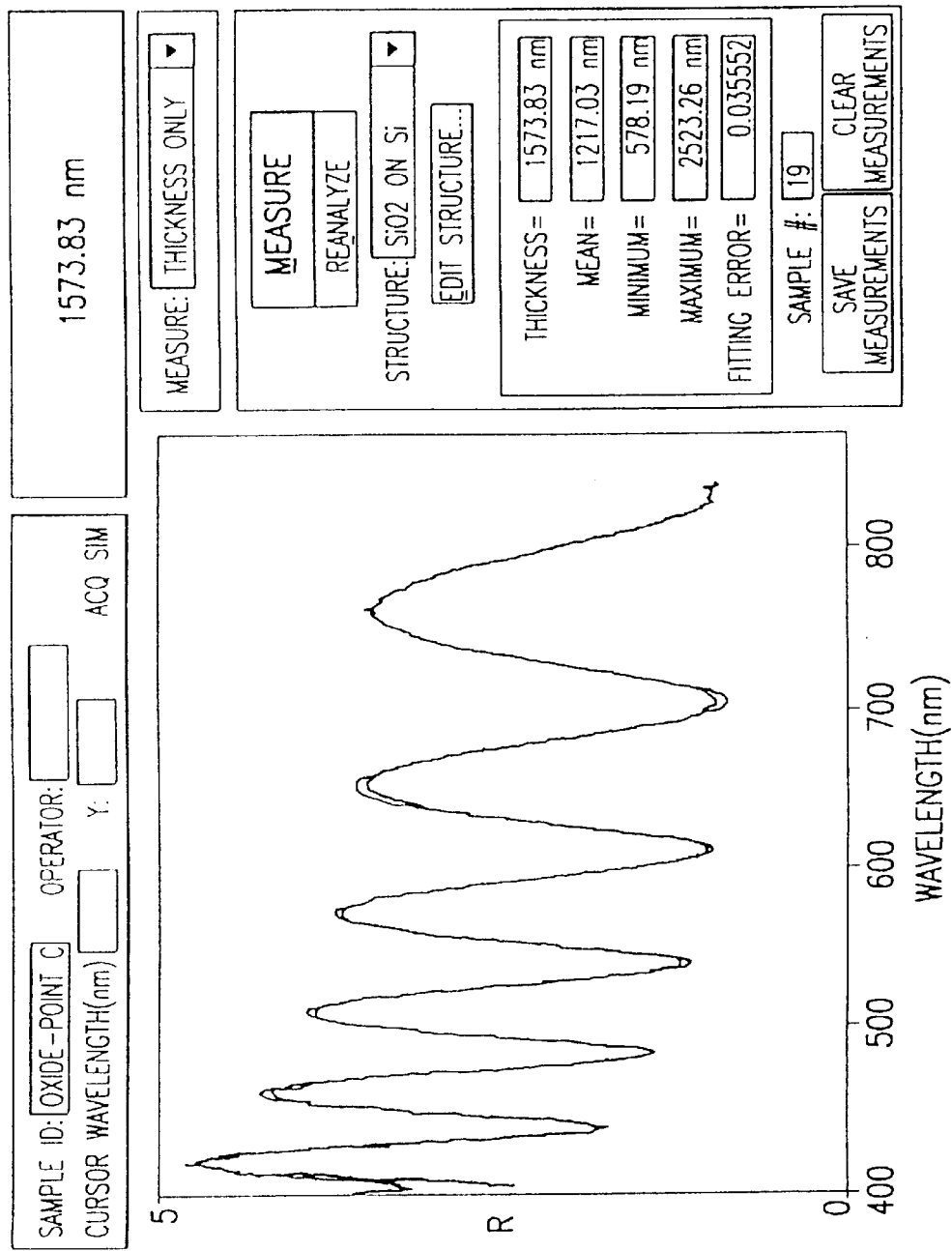
Figure 19B:
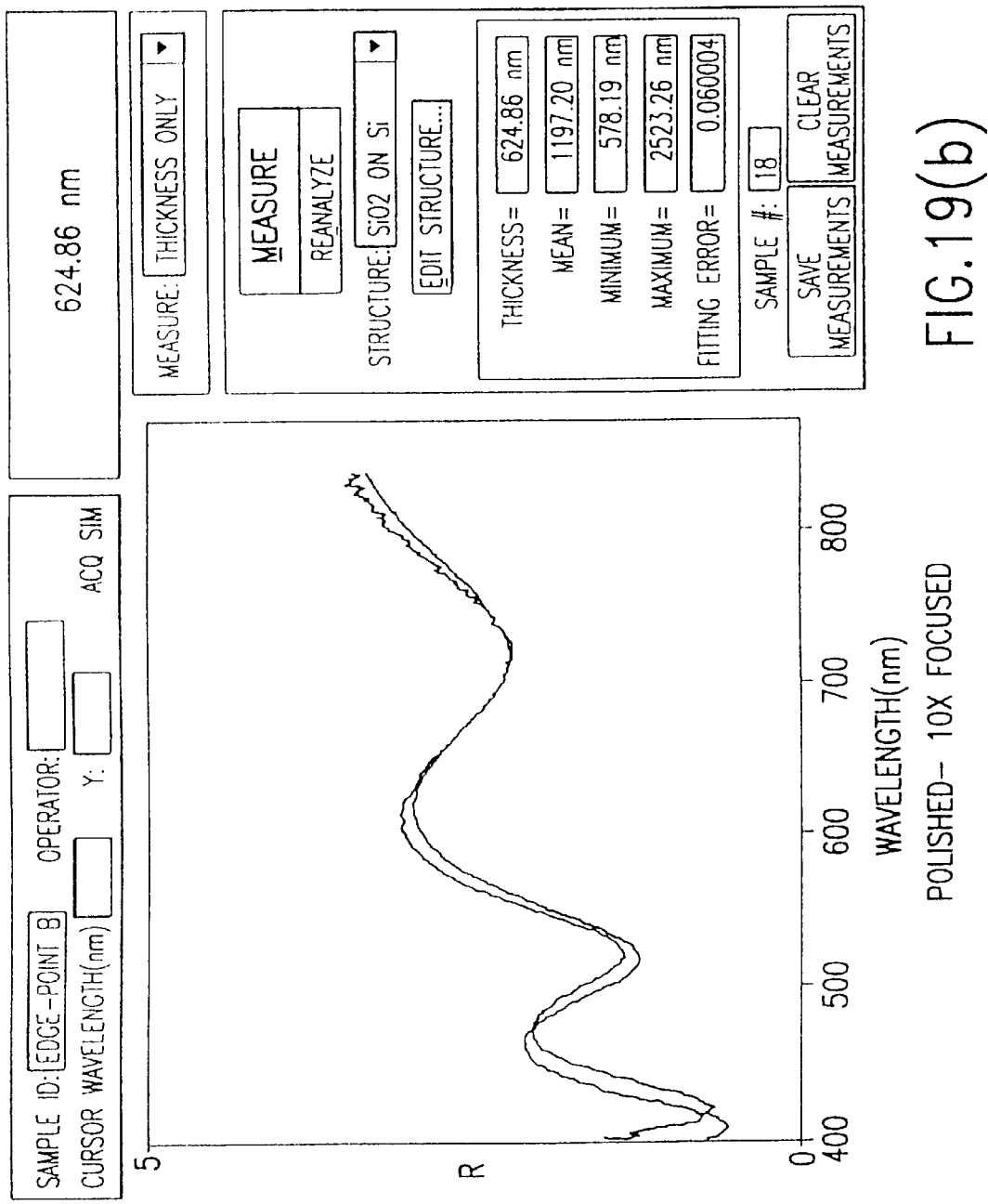
Figure 19C:
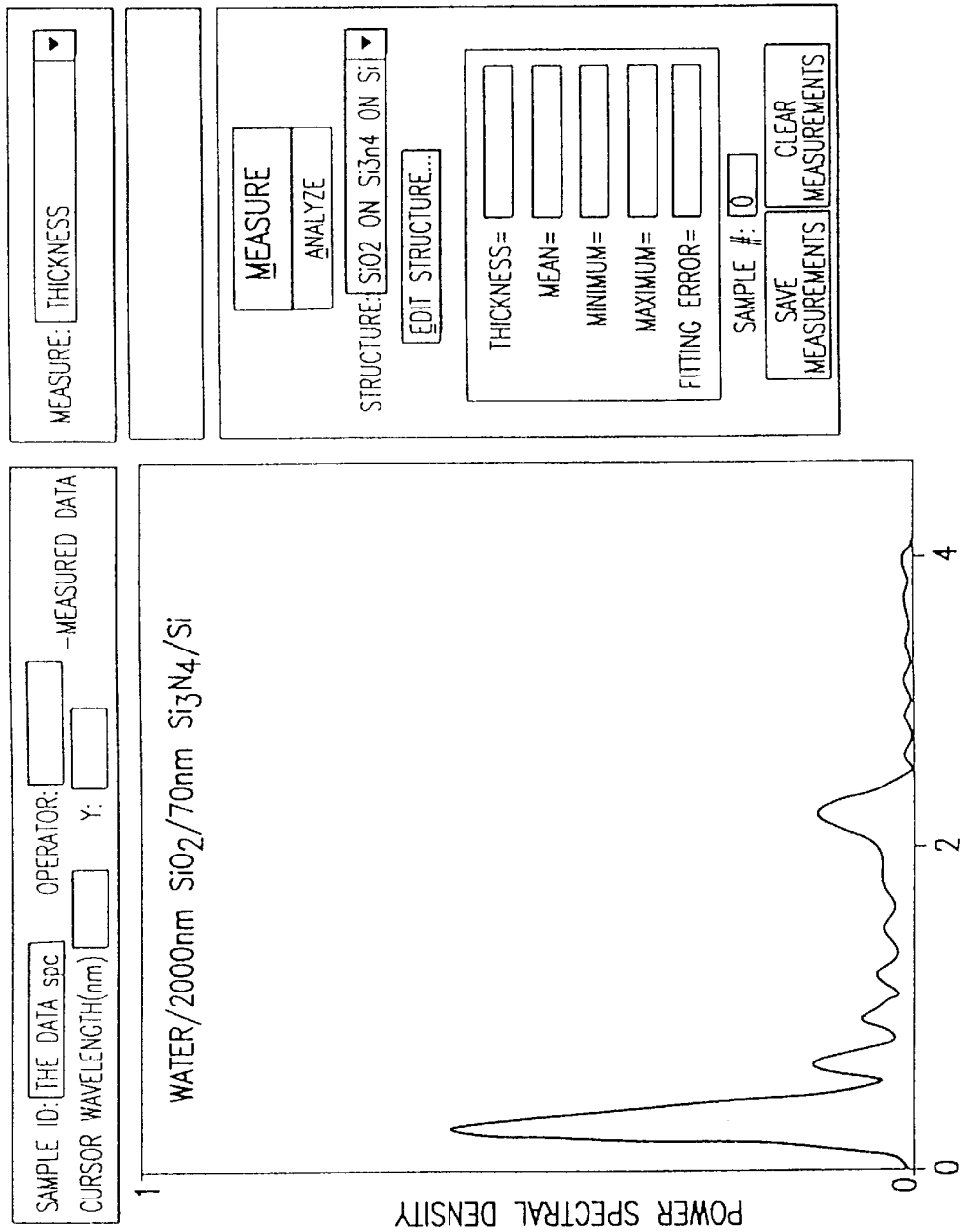
Figure 19D:
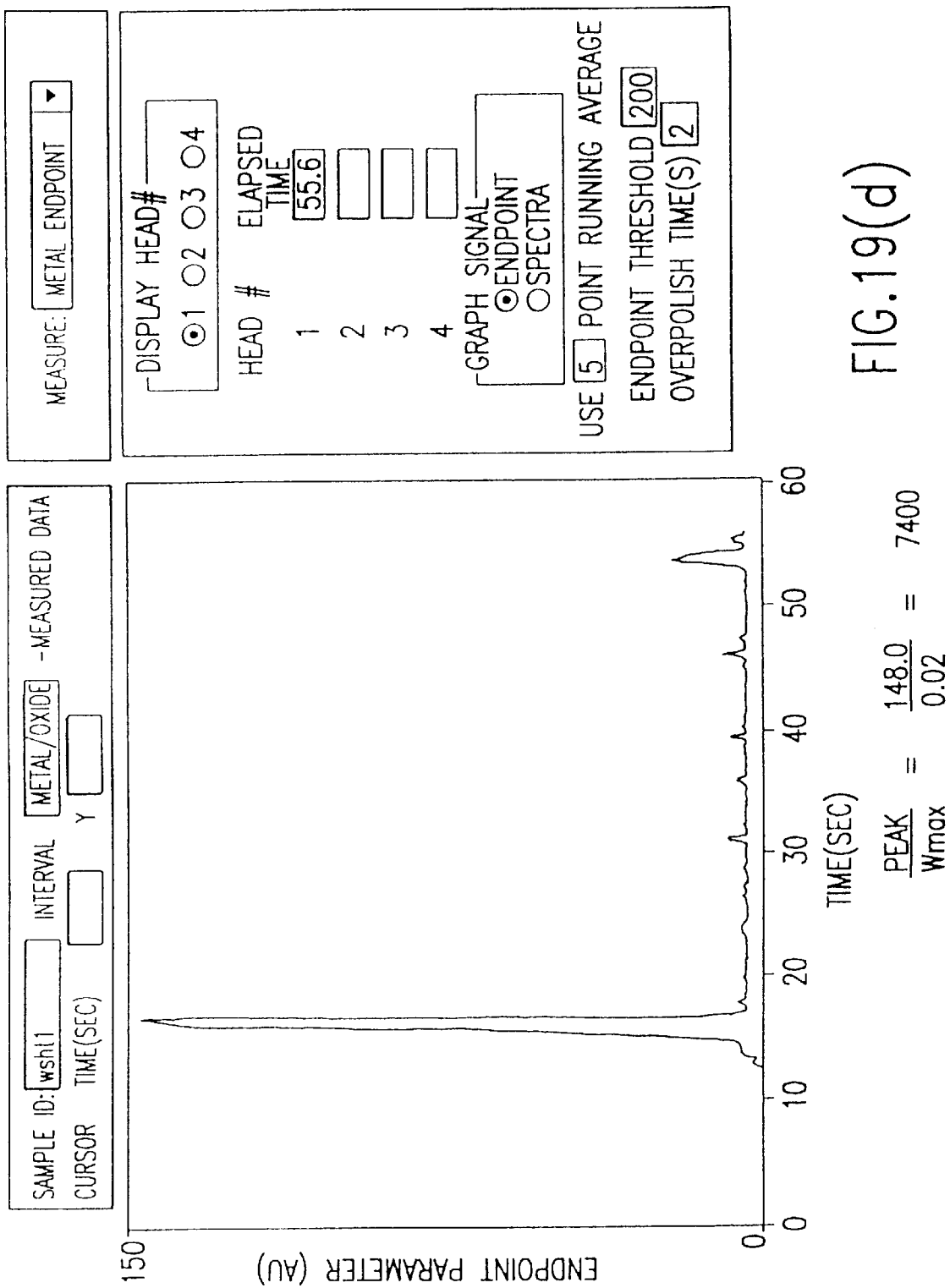
Figure 20:
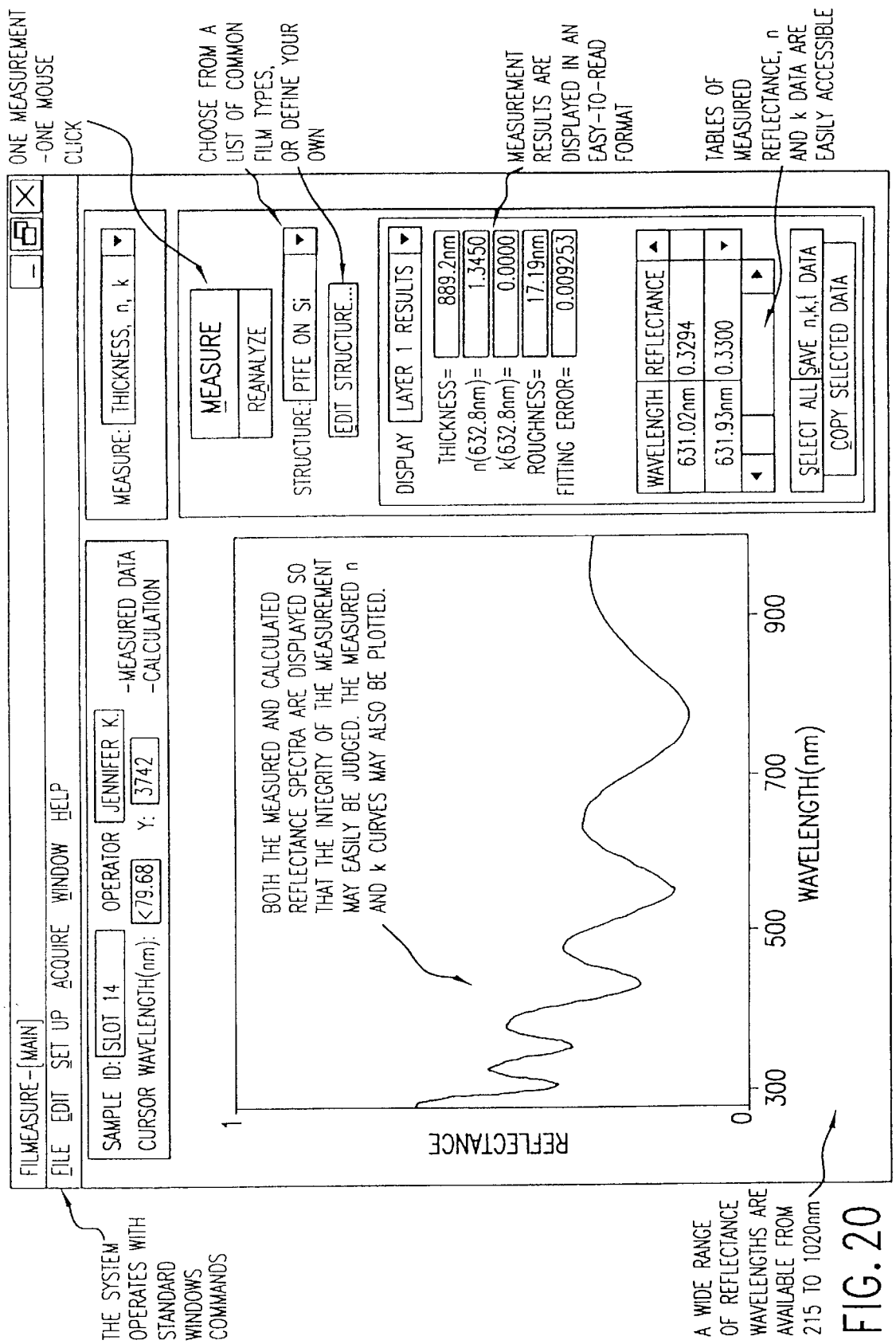

FIGS. 5(a) and 5(b) illustrate exemplary intensity spectra;

FIGS. 6(a) and 6(b) illustrates exemplary Power Spectral Density functions;

FIG. 7 illustrates an exemplary embodiment of a spectrometer of the first embodiment;

FIG. 8 illustrates a method in accordance with the first embodiment;

FIGS. 9(a)–9(e) are examples of the spectra of the various optical components of the apparatus depicted in FIG. 3;

FIGS. 10(a)–10(c) illustrate an application of the second embodiment of the subject invention involving removal of a metal layer from a semiconductor wafer after formation of metal contact holes has been achieved;

FIG. 11(a) is an example of the intensity spectra of light reflected from an opaque film, and FIG. 11(b) is an example of the intensity spectra of light reflected from a transparent or semi-transparent film;

FIGS. 12(a)–12(d) illustrate the basis for using an endpoint parameter, Q(t), to detect endpoint conditions;

FIG. 13 illustrates the transition of the endpoint parameter upon the occurrence of an endpoint condition;

FIG. 14 illustrates a method in accordance with a second embodiment of the subject invention;

FIG. 15 illustrates a patterned wafer or film;

FIGS. 16(a)–16(d) provides an explanation of the use of the subject invention to measure the thicknesses of multiple films in a patterned film;

FIG. 17 illustrates a method in accordance with a third embodiment of the subject invention;

Figure 18:
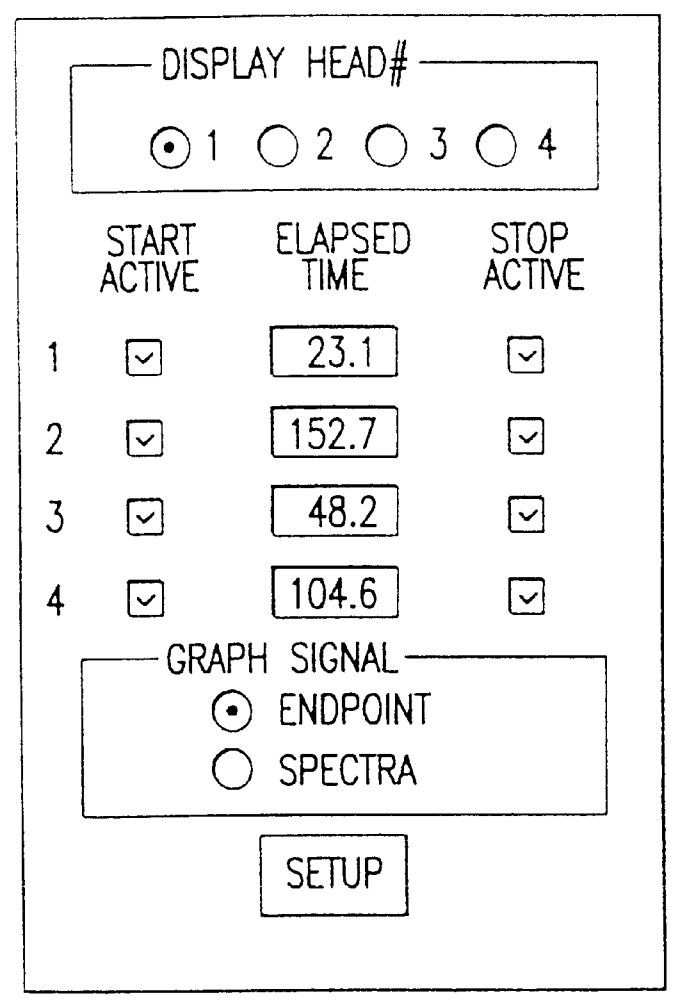

FIG. 18 is an example of a report showing the status of CMP processing utilizing the subject invention;

FIGS. 19(a)–19(d) are examples of reports produced by an embodiment of the subject invention displaying exemplary plots of R(λ), PSD(d), and Q(t); and FIG. 20 is a representative report showing additional features of an embodiment of the subject invention.

V. DETAILED DESCRIPTION OF THE PREFERRED EMBODIMENTS

Figure 1:
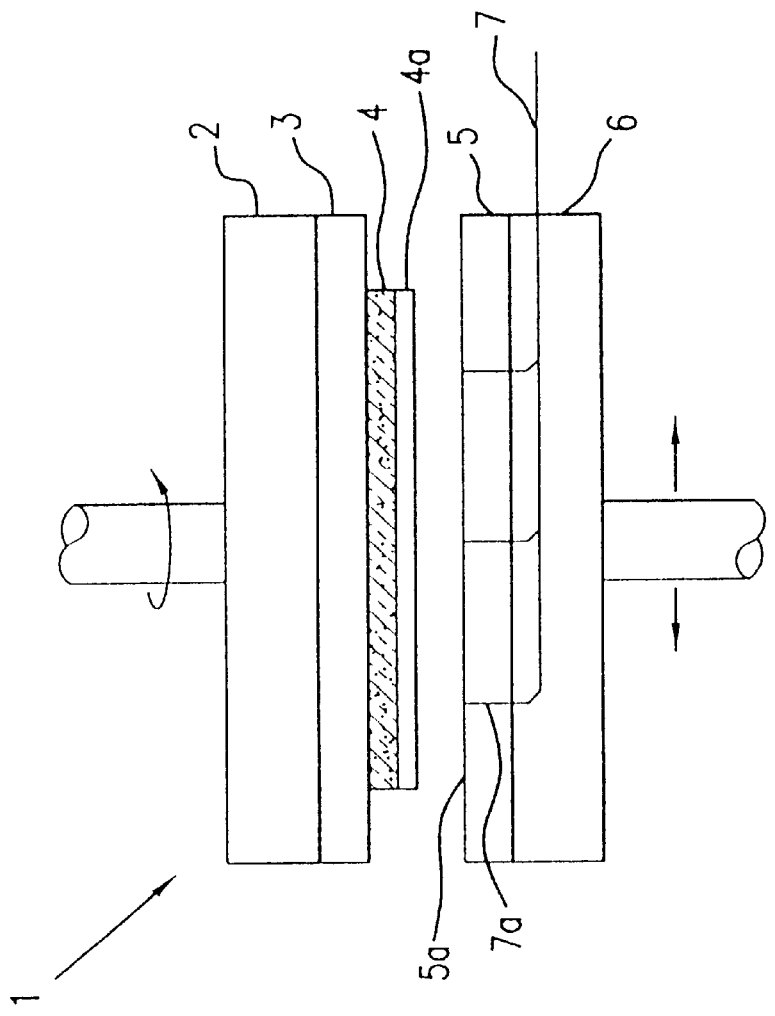
FIGS. 1 and 2 illustrate an exemplary embodiment of a CMP station.
Figure 2:
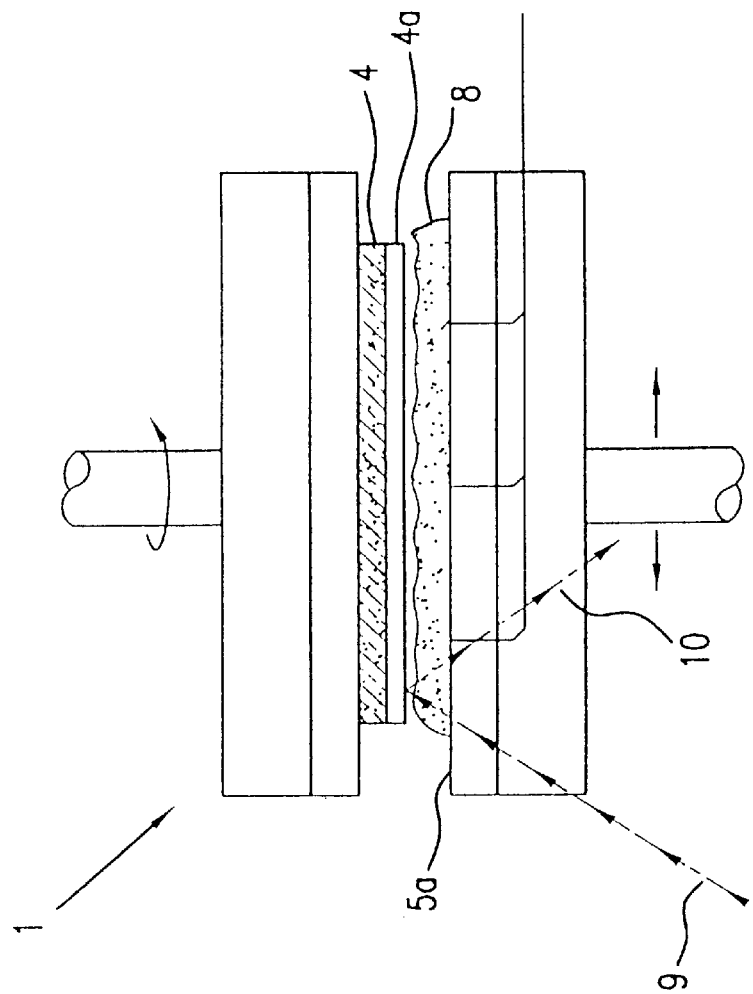

A first embodiment of the subject invention, suitable for use in measuring the thickness of transparent or semi-transparent films, is illustrated in FIG. 3, in which, compared to FIGS. 1–2, like elements are referenced with like identifying numerals. Advantageously, the film to be measured ranges in thickness from 0.0001 $\mu$m. to 500 $\mu$m., but it should be appreciated that this range is provided by way of example only, and not by way of limitation. This embodiment is advantageously configured for use with CMP station 1, previously illustrated in FIGS. 1–2. This embodiment also comprises a light source 11 coupled to an optical fiber or fiber bundle 12 for delivering light from the light source to the CMP station 1. Preferably, the light source is a white light source. Advantageously, the light source is a tungsten-halogen lamp or the like in which the output is regulated so that it is substantially invariant over time.

Also included are fiber/fiber bundle 16, spectrometer 15, and computer 15. Light from the CMP station 1 is passed to spectrometer 15 by means of fiber/fiber bundle 16, and data produced by the spectrometer responsive to the light received over fiber/fiber bundle 16 is provided to computer 17 over one of more signal lines 18. The computer is capable of printing this data, or plotting it in graphical form. In addition, the computer is capable of analyzing this data through suitable techniques to arrive at an accurate estimate of the thickness of film 4a, despite the presence of the slurry 8, and despite any distortion introduced by the light source 18, fiber/fiber bundle 12, fiber/fiber bundle 16, or spectrometer 15. The computer is also configured to perform endpoint detection, i.e., determine when the thickness of film 4a is at a desired thickness, and responsive thereto, provide a signal on signal line 19 directing the CMP station to stop the planarization or polishing process of film 4a.

As shown, the fiber/fiber bundle 12 extends through the lower platen 6 and polishing pad 5 of CMP station 1 but ends at about the upper surface 5a of the polishing pad 5 and spaced from the upper surface of the film 4a. Advantageously, this spacing is in the range of 0.1 mm. to 2 mm, and most advantageously, in the range of 0.1 mm. to 1 mm. Again, however, this range is provided by way of illustration only, and not by way of limitation. The fiber/fiber bundle 12 is configured such that the light 13 emitted from the end of the fiber/fiber bundle travels through the slurry 8 whence it impinges upon transparent or semi-transparent film 4a situated on top of substrate 4.

As shown, a second fiber/fiber bundle 16 is provided. It has an end, identified in the figure with numeral 16a, which extends through lower platen 6 and polishing pad 5 but ends at about the upper surface 5a of the polishing pad 5 and spaced from the upper surface of the film 4a. Again, by way of illustration only, and not by way of limitation, this spacing is advantageously in the range of 0.1 mm. to 2 mm., and most advantageously, in the range of 0.1 mm. to 1 mm. The fiber/fiber bundle 16 extends through the lower platen 6 and polishing pad 5 at a location which is in proximity to the location at which the end 12a of the first fiber/fiber bundle 12 extends through lower platen 6 and polishing pad 5. The fiber/fiber bundle 16 is configured to deliver light 14 reflected from the upper surface of film 4a and/or the upper surface of substrate 4 to spectrometer 15 after the same has passed through the slurry 8.

Although fiber/fiber bundles 12 and 16 are illustrated in FIG. 3 as the means for delivering light to and from CMP station 1, it should be appreciated that other suitable means are possible for performing these functions, including directing mirrors and the like. In addition, it should be appreciated that, in addition to the components illustrated in FIG. 3, it is possible to add other optical components, such as a focusing lens or the like, along the optical path of the light illustrated in FIG. 3 without departing from the spirit and scope of the invention.

Spectrometer 15 is configured to dissect light 16 into its constituent wavelengths, which are hereinafter referred to with the symbol $\lambda$. With reference to FIG. 7, a representative embodiment of spectrometer 15 comprises a slit 22, aperture 23, collimating mirror 24, diffraction grating 25, focusing mirror 26, focusing lens 27, and photodiode array 28. Advantageously, the slit 22 is a 10 $\mu$m. slit, but it should be appreciated that other dimensions are possible. The collimating mirror 24 and aperature 23 are advantageously aligned with one another. In addition, collimating mirror 24 is advantageously a highly polished precision mirror configured to direct light 30 onto diffraction grating 25. Diffraction grating 25 is advantageously a glass or polished metal surface having a large number of very fine parallel grooves or slits cut into the surface thereof. Preferably, the diffraction grating divides the light 30 into its constituent wavelengths.

Opposite the diffraction grating 25 is a focusing mirror 26, configured to receive the light spectra 31 from diffraction grating 25, and direct the same to focusing lens 27. The focusing lens 27 is advantageously configured to substantially evenly spread the light spectra onto photodiode array 28. The photodiode array 28 comprises a plurality of photodiodes which function as receptors. Advantageously, one or more such receptors are provided for each frequency or frequency band of interest. Each receptor is a photodiode comprising a two electrode radiation sensitive junction formed of a semiconductor material in which the reverse current varies with the incident illumination. The output of the photodiode array 28 is a plurality of electrical signals, with one such signal advantageously provided for each of the frequencies or frequency bands of interest and which is representative of the intensity of the incident light at the frequency or frequency band of interest.

In operation, the spectrometer operates as follows. Light 29 from fiber/fiber bundle 16 passes through the slit 22 and aperature 23, whence it strikes collimating mirror 24. The light 30 which ensues from collimating mirror 24 impinges upon diffraction grating 25, which dissects the light into its constituent wavelengths. The resulting light spectrum 31 then impinges upon focusing mirror 26 which directs the ensuing light 32 to focusing lens 27. Focusing lens 27 in turn directs the light to photodiode array 28. Again, photodiode array 28 comprises a plurality of photodiodes each of which is configured to detect a different wavelength of light, and each of which produces an electrical signal which is representative of the intensity of the incoming light 32 at that wavelength. The plurality of electrical signals which results, which are collectively identified with numeral 33 in the figure, is then provided to circuitry 34. Circuitry 34 comprises electronic circuitry such as a digitizer for amplifying and digitizing each of the electrical signals identified in the plurality 33. The amplified and digitized signals which result, collectively identified with numeral 18 in the figure, is then provided to computer 17. Thus, it can be seen that spectrometer 15 provides a plurality of digitized electrical signals or data, each representative of the intensity of the light received from fiber/fiber bundle 16 at a particular wavelength.

When the intensity data obtained from the signals 18 are plotted as a function of $$z = \frac{n}{\lambda},$$

in which n is the refractive index of the material making up the film, and $\lambda$ is the wavelength of the light, curves such as those illustrated in FIGS. 5(a) and 5(b) result. Each of these curves generally follows an equation of the following form:

$$R = A + B\cos\left(\frac{2\pi}{\lambda}nd\right) \qquad (1)$$

In this equation, A and B are constants, n is the refractive index of the material making up film 4a, $\lambda$ is the wavelength of the light, and d is the thickness of the film. Generally speaking, the value of n varies with $\lambda$.

Figure 4:
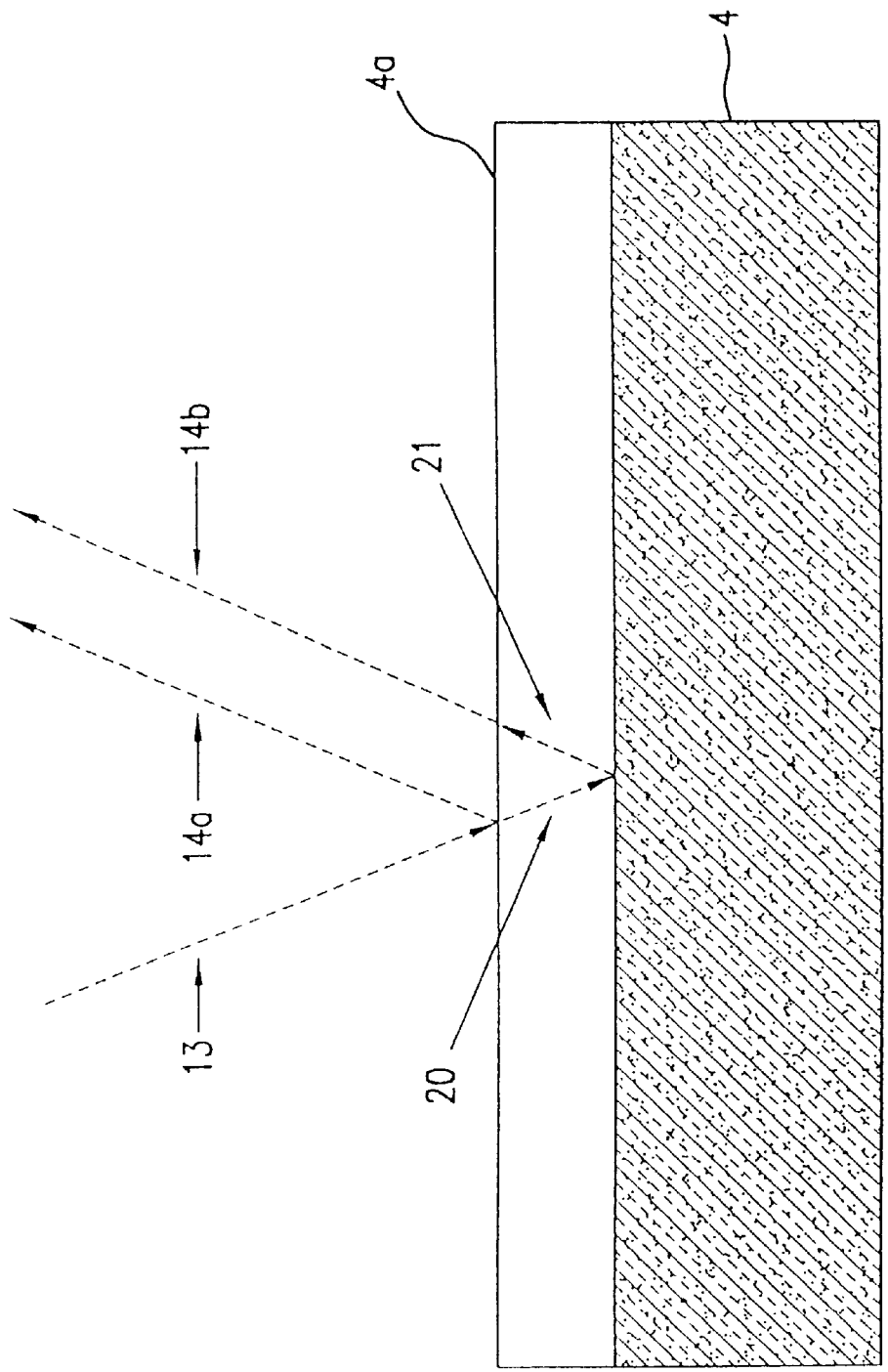
FIG. 4 illustrates the interaction between reflected light from a film.

The derivation of this equation can be explained with reference to FIG. 4, which illustrates light 13 impinging upon film 4a situated over substrate 4. As can be seen, some of this light, identified with numeral 14a in the figure, reflects off of the top surface of film 4a. The rest of this light, identified with numeral 20 in the figure, continues into film 4a. A fraction of this light, identified with numeral 21 in the figure, reflects off the top surface of substrate 4, and is emitted through the upper surface of film 4a. This light is identified with numeral 14b in the figure.

When the light 14a and light 14b are in phase, they will add constructively. This condition will occur when the optical distance the light travels through the film, a value which is proportional to 2nd, is an integer multiple of the wavelength of the wavelength $\lambda$, i.e., is equal to i$\lambda$, where i is an integer. Conversely, when the light 14a and light 14b are out of phase, they will add destructively. This condition will occur when the optical distance the light travels through the film, a value which is proportional to 2nd, is an integer half multiple of the wavelength $\lambda$, i.e., is equal to $$\left(i+\frac{1}{2}\right)\lambda,$$

where i is an integer. These two conditions, when combined, yield the foregoing equation (1).

These curves exhibit a periodicity with the value $$z=\frac{n}{\lambda}$$

which is representative of the thickness d of the film 4a. In fact, the length of the period which is exhibited will be inversely proportional to the thickness of film 4a. Thus, in FIG. 5(a), the period of the curve which is exhibited, indicated by T1 in the figure, is representative of a thickness d1, and in FIG. 5(b), the period of the curve which is exhibited, indicated by T2 in the figure, is representative of a film having a thickness d2 which is greater than d1.

With reference to FIG. 3, the digitized data from the spectrometer is then passed to computer 17 over one or more signal lines 18. For purposes of this disclosure, a computer is any processing device which is actuated responsive to sequential commands, such as commands stored in a memory or the like. Responsive to this information, the computer is advantageously configured to produce graphical representations in a form such as that exhibited in FIGS. 5(a) and 5(b).

In the foregoing embodiment, although a spectrometer is illustrated and described as the means for determining the intensity of the reflected light as a function of wavelength, it should be appreciated that other means are possible for performing this function, and other types of spectrometers are possible than the type illustrated in the figure.

The principal function of computer 17 is to perform a spectral analysis of this data to obtain a precise estimate of the thickness of film 4a. To accomplish this function, the computer is configured to employ various forms of spectral analysis, such as Fourier Transform analysis, and Power Spectral Density analysis. Advantageously, the computer is configured to begin the analysis by first ordering the intensity data from the spectrometer 15 by $$\frac{n}{\lambda}.$$

The computer is also advantageously configured to obtain the Fourier transform of this data using a Fast Fourier Transform algorithm of the type described in Chapter 12 of William H. Press et al., Numerical Recipes in C, The Art of Scientific Computing ($2^{nd}$ ed. 1992), Cambridge University Press; which is hereby fully incorporated by reference herein as though put forth in full. Advantageously, since the intensity data is real, the algorithm listed on pages 513–514 (which in turn calls the algorithm on pages 507–508) is the one that is used since it is specifically configured for use with real-valued data functions. The result of this is a Fourier transform of the intensity data in which the dependent variable is d, potential film thickness.

From this, the computer is configured to derive the Power Spectral Density (PSD), in which the dependent variable again is potential film thickness d. Such a function that describes a spectral density when the dependent variable is potential film thickness d can be referred to as a thickness spectrum. The computer is also configured to then determine the estimated film thickness of film 4a by locating a peak in the PSD, and then identifying the value of d which corresponds to this peak. In one implementation, a user knows beforehand the approximate location of a peak for a given sample, that is, the peak that is appropriate for estimating film thickness. In this implementation, the user indicates this approximate location or locations to the computer, which then seeks to detect a peak at this location. If a peak is found, the estimated film thickness is taken to be the thickness corresponding to this peak. In another implementation example, the estimated film thickness is a value derived from the thickness corresponding to the selected peak. In one implementation example, the estimated film thickness is determined by matching a measured thickness spectra to a calculated or simulated thickness spectra.

Graphically, the procedure is illustrated in FIGS. 6(a) and 6(b), which illustrate exemplary PSDs. In FIG. 6(a), the estimated film thickness would be a value derived from d1, since that is the value of the dependent variable which corresponds to the peak of the waveform there illustrated. Similarly, in FIG. 6(b), the estimated film thickness would be a value derived from d2, since that is the value of the dependent variable which corresponds to the peak of the waveform there illustrated.

A mathematical description of the procedure will now be provided. Letting z refer to the variable $$\frac{n}{\lambda},$$

R to the intensity data provided by spectrometer 15, and R(z) to the intensity data ordered as a function of z, the Fourier transform of R(z), FT(d), is obtained in which the dependent variable is d, potential film thickness. The following equation describes this step:

$$FT(d) = \int_0^\infty R(z)e^{j2\pi zd}\,dz \qquad (2)$$

Note that the above integral is only taken over the interval 0 to ∞ since that interval represents the only possible values of z.

The Power Spectral Density of R(z), PSD(d), is then obtained as described in the following equation:

$$PSD(d)=2(Re[FT(d)]^2+Im[FT(d)]^2) \qquad (3)$$

Note that PSD(d) is advantageously a one-sided power spectral density function which is defined only for values of d≧0. The one-sided power spectral density function is defined according to the following equation:

$$PSD(d)=|FT(d)|^2+|FT(-d)|^2 \quad 0\leq d\leq\infty$$

However, since R(z) is real, it is known that FT(d)=FT(−d)*, where * refers to the complex conjugate function. That means that |FT(d)|=|FT(−d)|, and thus that PSD(d)=2|FT(d)|². Since |FT(d)|²=(Re[FT(d)]²+Im[FT(d)]²) the foregoing equation (3) results.

The computer is optionally configured to compare the estimated film thickness with a desired film thickness, and responsive thereto, generate a signal on signal line 19 for directing the CMP station 1 to cease or at least regulate the polishing action underway on film 4a. By way of illustration only and not by way of limitation, the computer is configured to generate a signal directing the CMP station to stop the polishing action on film 4a responsive to an endpoint condition, i.e., an indication that the estimated film thickness is about at or below the desired film thickness.

A method of estimating film thickness in accordance with the foregoing embodiment will now be described. With reference to FIG. 8, in step 35, light reflected from the film being measured is received, and in step 36, the intensity of each or substantially each of the constituent wavelengths of the light is obtained.

In step 37, this intensity data, R, is arranged as a function of $$z = \frac{n}{\lambda}.$$

Then, in step 38, the Fourier Transform, FT, of this intensity data is determined as a function of d, potential film thickness. Mathematically, this step can be described by equation (2), set forth above.

In step 39, the Power Spectral Density function, PSD, is obtained as a function of d. Equation (3), set forth above, is a mathematical representation of this step.

Finally, in step 40, a selected peak of the PSD data determined in step 39 is obtained. From this, an estimate of film thickness is derived from the value of d corresponding to the peak of PSD(d).

Additional steps, not shown in FIG. 8, but which are optionally part of the subject method, particularly in the case in which the film under evaluation is undergoing CMP, is the step of generating a signal, responsive to a comparison between the estimated and desired film thicknesses and representative of an endpoint condition, and the step of stopping or at least regulating the CMP procedure on the film responsive to the signal.

It should be appreciated that step 37 in the foregoing embodiment can be eliminated or modified such that the Fourier Transform is performed on the incoming intensity spectra as a function of a variable other than z, such as, for example, λ or $$\frac{1}{\lambda}.$$

In the case in which n is relatively constant over the wavelength region of interest, for example, the data can be left ordered as a function of λ, or it can be ordered as a function of $$\frac{1}{\lambda}.$$

In addition, it should further be appreciated that step 39 in the foregoing embodiment can be eliminated, and the estimation of film thickness determined directly from the Fourier Transform, FT(d), determined in step 38. Moreover, it should be appreciated that steps 38 and 39 in the foregoing method can be combined into a single step by employing algorithms which compute the Power Spectral Density function, PSD(d), directly from the incoming intensity spectra, R(z). It should further be appreciated that other forms of spectral analysis are possible as long as a peak is detectable for positive values of d, and the value of d at the location of this peak can be determined. One such example is the double-sided Power Spectral Desnity function, PSD (d), which is defined for both positive and negative values of d. The double-sided PDF(d) function will be symmetrical around d=0, and thus will exhibit symmetrical peaks for both positive and negative values of d. An accurate estimate of film thickness can be obtained simply by using the peak located in the region in which d is positive, and ignoring the curve in the region in which d is negative.

Although the foregoing embodiment is described in the context of CMP processing of semiconductor wafers, and is illustrated in combination with a CMP station for performing this function, it should be appreciated that it is possible to employ this embodiment in other contexts and in combination with other processing apparatus. Other possible applications include providing thin film scratch resistant and/or antireflective optical coatings to automotive plastics, eyeglass lenses, and the like plastics packaging applications, and applications involving providing proper polymide and resist thicknesses for flat panel display manufacturing.

In fact, any application or industrial process in which in-situ film measurement is desired, i.e., film measurement during an ongoing industrial process in which noise or distortion introduced by the industrial process interferes with or distorts the light reflected from the film, is possible for use with the subject embodiment. To appreciate this, consider that the light intensity data R(z)received at the computer 17 can actually be considered the product of three components as follows:

$$R(z)=I(z)*S(\lambda)*K(t)$$

where I(z) is the actual reflectance of the film under measurement as a function of z, S(λ) is an arbitrary function which characterizes the wavelength dependence of the optical components of the system, and K(t) is a function that allows for time-dependent intensity variations such as changes in illumination intensity, sample placement, film processing variations, etc. In the context of CMP processing, for example, S(λ) would capture the effects of the slurry.

Figure 9A:
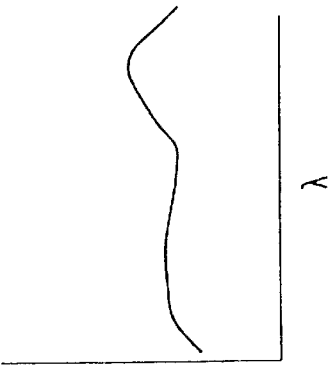
Figure 9B:
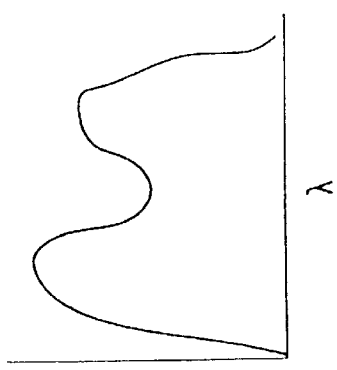
Figure 9C:
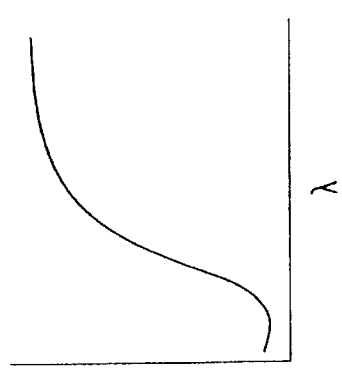
Figure 9E:
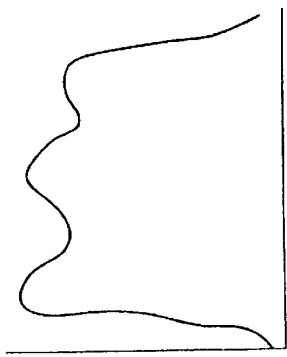
Figure 9D:
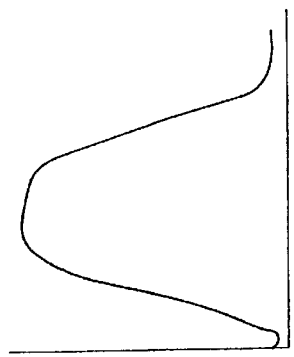

An exemplary graph of S(λ) is illustrated in FIG. 9(e). This graph is a composite of the graphs of FIGS. 9(a)–9(d). FIG. 9(a) illustrates an exemplary graph of the response of the light source 11 as a function of λ, FIG. 9(b) represents a similar response for fiber/fiber bundles 12 and 16, FIG. 9(c) illustrates a similar response for the slurry 8, and FIG. 9(d) represents a response of the spectrometer 15 as a function of λ.

Despite the distortion introduced into I(z) by S(λ) and K(z), the subject embodiment is still able to provide an accurate estimate of film thickness by taking advantage of the fact that these distortions are typically not periodic with λ or z. Consequently, they will not typically give rise to a peak of any significance in the FT(d) or PSD(d) curves which result. Thus, despite the presence of these distortions, the estimated film thickness, equal to the value of d at the location where the peak occurs in the FT(d) or PSD(d) data, can still be determined.

Additional advantages of the foregoing embodiment is that it is particularly well-suited for real time applications. The reason is that data collection steps employing time-consuming angular or mechanical sweeps of optical components as found in the prior art are eliminated, and in addition, the number of analytical steps performed by the computer 17 is limited to one or only a very few. For example, in the subject embodiment, the spectrometer 15 directly provides digitized values of intensity of the incoming light as a function of λ without requiring mechanical sweeping steps or the like. In addition, the estimated film thickness d can be determined directly from the FT(d) or PSD(d) data after the same has been determined without requiring any additional analytical steps.

A second embodiment of the subject invention, suitable for performing endpoint detection for opaque films comprised of a material such as metal situated on top of a transparent or semi-transparent substrate, will now be described. This embodiment is similar to the previous embodiment, and is best described in terms of the differences from that embodiment.

According to this embodiment, a precise quantitative measurement of the thickness of the opaque film is not provided. Instead, an endpoint parameter is provided from which an endpoint condition can be detected, i.e., the condition in which the opaque film is or is about to be completely removed from the surface of the transparent/semi-transparent substrate.

This embodiment is particularly well-suited for those applications in which a metal layer is placed over a substrate formed of a material such as an insulator in order to fill contact holes for providing electrical contact to layers below the insulator, and then, in a subtractive process, removed from the insulator to leave just the metal in the contact holes.

Such an application is illustrated in FIGS. 10(a)–10(c). FIG. 10(a) illustrates a film 41 on which is placed insulating film 42 in which contact holes 43a and 43b have been etched. FIGS. 10(b) illustrates this structure after a metal layer 44 has been placed over the insulating layer 42, thereby filling contact holes 43a and 43b with metal. FIG. 10(c) illustrates this structure after the metal layer 44 has been removed from the surface of film 42. As can be seen, the metal within the contact holes 43a and 43b remains. It is desirable to be able to remove layer 44 through CMP polishing and the like, and detect when layer 44 is or about to be removed from the surface of film 42 in order to stop the CMP polishing process.

As with the previous embodiment, this embodiment is advantageous for use in combination with CMP station 1, but it should be appreciated that this embodiment is possible for use with other industrial processes in which end point detection of an opaque film is desired, and is particularly advantageous for use in applications in which in situ and/or real time end point detection of opaque films is desired.

With the exception of computer 15, the components of this embodiment are configured identically to like components of the first embodiment. In the case of computer 15, the analytical steps employed are slightly different to account for the fact that an opaque film does not give rise to an intensity spectrum of the type illustrated in FIGS. 5(a) and 5(b) and described in equation (3), i.e., a spectrum which is periodic with the value of $$z = \frac{n}{\lambda}.$$

Instead, as shown in FIG. 11(a), which illustrates an exemplary intensity spectrum for an opaque film, the intensity spectrum for an opaque film is not generally periodic with the variable z.

When the CMP procedure has progressed to the point in which the opaque layer is or is about to be completely removed from the surface of the underlying layer (e.g., the situation illustrated in FIG. 10(c)), the intensity spectrum which results will resemble that illustrated in FIG. 11(b), an exemplary intensity spectrum for a transparent or semi-transparent layer on which is situated a very small residual amount of an opaque layer. As can be seen, the curve in FIG. 11(b) differs quite a bit from that illustrated in FIG. 11(a). An object of this embodiment is to determine when this transformation of the intensity spectrum has occurred.

To accomplish this objective, the computer 15 is configured to periodically compute an endpoint parameter, Q(t), which is a function of time, and which is described mathematically by the following equation:

$$Q(t) = \int_0^\infty PSD\left[\frac{R(z,t)}{R(z,0)} - 1\right] d\,d \quad (5)$$

in which R(z, t) is the intensity data from spectrometer 15 at time t as a function of $$z = \frac{n}{\lambda},$$

R(z,0) is this intensity data at time t=0, PSD refers to the one-sided Power Spectral Density function discussed previously in which the dependant variable is d, and in which the argument is $$P(z,t) = \frac{R(z,t)}{R(z,0)} - 1,$$

, and Q(t) is the integral of this function over positive values of d. When Q(t) makes a discontinuous jump from about 0 to a positive value over a specified threshold, signifying that the opaque layer is or is about to be completely removed from the underlying layer, the computer is configured to provide a signal on signal line 18 indicative of an endpoint condition. The purpose is to signal CMP station 1 and the like to cease work on the film.

The endpoint parameter Q(t) can be further explained with reference to FIGS. 12(a)–12(d). To normalize R(z,t) for the effects depicted above in equation (4), and assuming that the signal I(t) does not change rapidly over time, R(z,t) is divided by R(z,0), a baseline sample of R(z,t) at t=0. In practice, this is accomplished by storing R(z,0) and using it to normalize R(z,t) each time it is sampled. The value "1" is then subtracted from this normalized sample to obtain P(z,t).

At an arbitrary time t1 before the endpoint condition is realized, and given the assumption that K(t) from equation (4) varies slowly with time, a plot of P(z,t1) versus z will appear as in FIG. 12(a). As can be seen, the variable is almost 0 for all values of z. Thus, the PSD of P(z,t1), which is shown in FIG. 12(b), is likewise almost 0 for all values of d. Consequently, the value of Q(t1), which is the integral of the curve in FIG. 12(b) over all values of d, is also about 0. This is indicated in FIG. 13, which is a plot of Q(t) over time.

At a time t2, which is assumed to be when the endpoint condition is realized, a plot of P(z,t2) will appear as shown in FIG. 12(c). Since that curve exhibits a high degree of periodicity, a plot of the PSD of P(z,t2) will appear as shown in FIG. 12(d). The peak illustrated in FIG. 12(d) occurs at a value d=d1, where d1 is about the film thickness of the film underlying the opaque layer. The value of Q(t2), which represents the integral of the curve shown in FIG. 12(d) over all values of d, will then make a discontinuous jump to a large positive number. Such is illustrated in FIG. 13, which again is a plot of Q(t) versus time.

A method in accordance with the foregoing embodiment is illustrated in FIG. 14. In step 45, the intensity data is obtained from spectrometer 15, and ordered as a function of z to obtain R(z, 0). The data, which constitutes the baseline sample, is then stored for use in normalization.

In step 46, at an arbitrary time t≧0, the intensity data is again obtained, and ordered as a function of z to obtain R(z,t). In optional step 47, this data is normalized using the baseline data from step 45. Then, in optional step 48, which is a continuation of the normalization procedure, P(z,t) is determined from the data of step 47 in accordance with the following:

$$P(z, t) = \frac{R(z, t)}{R(z, 0)} - 1$$

In step 49, the PSD of P(z,t) is obtained. Advantageously, this is accomplished using the two-step procedure described by the following equations:

$$FT(d) = \int_0^\infty P(z, t)e^{j2\pi nd} \, dz$$

$$PSD(d) = 2|FT(d)|^2 \quad d \geq 0$$

Also advantageously, the Fast Fourier Transform algorithm described in the previous embodiment is used to compute FT(d).

In step 50, the variable Q(t) is determined in accordance with equation (5). Then, in step 51, a determination is made whether there has been a discontinuous jump towards the positive in Q(t). If not, a jump is made back to step 46, and the foregoing procedure repeated. If so, a jump is made to step 52. There, it having been determined that the endpoint condition is present, a signal is provided on an output signal line indicating the presence of the endpoint condition. Advantageously, steps 50–52 are accomplished by comparing Q(t) with a predetermined threshold value, and jumping to step 46 if the value is exceeded, and proceeding to step 52 if the value has not been exceeded.

An optional step, not shown in FIG. 14, is actually ceasing or regulating the processing of the film, either through CMP or the like, responsive to the endpoint condition signaled on the output signal line.

It should be appreciated that the normalization procedure depicted in steps 46–47 is not critical, and can be modified to allow for other forms of normalization, or be eliminated altogether. The important point is to ensure that the endpoint parameter does not yield a false positive, i.e., a false indication of an endpoint condition, because of the effects discussed in relation to equation (4).

In the foregoing procedure, it should be appreciated that step 49 can be eliminated, and Q(t) determined from FT(d) alone. It should further be appreciated that steps 48 and 49 can be combined into a single step through use of a suitable algorithm. In addition, it should be appreciated that alternative forms of spectral analysis, such as the double-sided PDF, can be employed in the alternative to the single sided PDF indicated in step 49.

A third embodiment of the subject invention, appropriate for use with patterned films, i.e., films of different thicknesses arranged over a substrate, including but not limited to semiconductor patterned wafers, will now be described. This embodiment is similar to the first embodiment, and so, as with the second embodiment, is best described in terms of its differences from the first embodiment.

This embodiment, as with the first embodiment, is particularly well-suited for use in combination with CMP station 1. In this application, a patterned semiconductor wafer would be positioned on the station in the place of film 4a and substrate 4. However, it should be appreciated that this embodiment can be used to measure patterned films in a variety of other applications, such as the applications discussed involving the placement of anti-reflective coatings on eyewear and automotive plastics, and polyimide coatings on flat panel displays.

With reference to FIG. 15, a patterned semiconductor wafer is illustrated. The patterned film comprises a substrate on top of which is situated film portions 54a, 54b, 54c of a film having a thickness d1, and film portions 55a, 55b of a film having a thickness d2, where d1≧d2. In this example, the portions 54a, 54b, 54c are situated in distinct geographical areas on the surface of substrate 53 than portions 55a, 55b, but it should be appreciated that applications are possible in which these portions are stacked on top of one another.

With the exception of computer 15, the components of this embodiment are configured identically to the components of the first embodiment illustrated in FIG. 3. In the case of computer 15, that device is configured slightly differently in a manner which will be discussed. Otherwise, the first embodiment will automatically handle without change an application involving patterned films.

To further explain this embodiment, it is helpful to refer to the curves of FIGS. 16(*a*)–16(*d*). FIG. 16(*a*) illustrates the intensity spectra, R1(z), that results from measuring, using the first embodiment, a film having a thickness d1, while FIG. 16(*b*) illustrates the intensity spectra, R2(z), that results from measuring, again using the first embodiment, a film having a thickness d2. As can be seen, each of the two curves is periodic, with the curve of FIG. 16(*a*) having a larger period than that of FIG. 16(*b*), reflecting the fact that the underlying thickness of the film from which FIG. 16(*a*) is derived, d1, is smaller that the underlying thickness of the film from which FIG. 16(*b*) is derived, d2.

In the case in which a multi-patterned film having films of both thicknesses is measured using the apparatus of the first embodiment, an intensity spectra, R(z), as shown in FIG. 16(*c*) results. As can be seen, this curve is essentially the summation of FIGS. 16(*a*) and 16(*b*), reflecting the fact that the intensity spectra is additive, i.e., R(z)=R1(z)+R2(z).

The one-sided Power Density Spectrum of R(z) will appear as shown in FIG. 16(*d*). As can be seen, there will be two peaks in the spectra, one corresponding to the thickness d1, and the other corresponding to the thickness d2. Again, because the Power Density Spectrum is additive, this curve is essentially the summation of the Power Density Spectra of R1(z) and R2(z), i.e., PSD[R(z)]=PSD[R1(z)]+PSD[R2(z)].

Thus, using the apparatus of the first embodiment, curves of the type shown in FIG. 16(*d*) can be graphically reported without any change to the computer 15. In the third embodiment, in which the computer is also capable of providing a quantitative estimate of film thickness, the computer is configured to detect the presence of multiple peaks in the PSD that results, and to determine and report the values of d corresponding to each one of the peaks. Thus, in the case of a curve such as shown in FIG. 16(*d*), the third embodiment is capable of detecting the presence of both peaks, and detecting the value of d, i.e., d1 and d2, that correspond to both peaks.

In addition, in the third embodiment, the computer is also configured to perform endpoint detection based on comparisons between desired and estimated film thicknesses for all of the films involved. Thus, in the case of FIG. 16(*d*), in which films of two thicknesses have been detected, the computer is capable of providing a signal on output line 19 if the estimated film thickness d1 is less than or equal to a desired value or the estimated film thickness d2 is less than or equal to a desired value.

A method for estimating film thickness in the patterned film context in accordance with the third embodiment is illustrated in FIG. 17. In step 56, the intensity spectrum, R, is again obtained as a function of λ. Then, in step 57, this data is arranged as a function of $$z = \frac{n}{\lambda}$$

to obtain R(z). In step 58, the Power Spectrum Density function of R(z) is determined. The resulting data, PSD(d), is a function of d, potential film thickness.

In step 59, the data obtained in step 58, PSD(d), is analyzed, and all the peaks therein are located. An estimated film thickness is then defined for each peak. In step 60, the estimated film thickness for a peak is set to a value derived from the value of d corresponding to that peak.

An optional step, not illustrated in FIG. 17, is to perform endpoint detection based on a comparison between estimated and desired film thickness for all or selected ones of the peaks detected in step 59. Advantageously, the default case is to detect an endpoint condition for all of the peaks which have been detected, i.e., to signal an endpoint condition if the estimated film thickness is less than or equal to the desired film thickness for any of the peaks which have been detected. However, it should be appreciated that this step can be performed for selected subcombinations of these peaks.

Advantageously, the PSD(d) referred to in step 58 is a one-sided Power Spectral Density function computed through the procedure described in relation to the previous embodiments, but it should be appreciated that other forms of spectral analysis, such as the Fourier Transform, or the two-sided PSD, are possible provided that the same provide a peak or other similar indicator for each value of d corresponding to an estimated film thickness of the sample under evaluation.

EXAMPLES

In an exemplary embodiment of the subject invention, the light source 18 is a tungsten/halogen regulated light source, the bulb of which is manufactured by Gilway Technical Labs., Woburn, Mass. This bulb generates light from approximately 400 nm to 3000 nm. The bulb is powered by a 5 V DC power supply. The 5 V DC power supply in turn is derived from a 24 V DC source, which is converted to 5 V through a high-frequency switching converter.

Fiber/fiber bundle 12 and fiber/fiber bundle 16 in this embodiment are each a single optical fiber having a diameter of about 0.5 $\mu$m. Moreover, the spot size of the light which impinges on the surface of the film under measurement in this embodiment is adjustable from 500 $\mu$m. to 1 cm.

This embodiment is configured for simultaneous use with four different ones of a CMP station 1 developed by Integrated Processing Equipment Corp. ("IPEC"), Phoenix, Ariz., which also manufactures the optical interface between fibers 12 and 16 and CMP station 1. Briefly, in accordance with this interface, the ends of the fibers 12 and 16 are level with the top surface of polishing pad 5, and, in operation, the spacing between the ends of these fibers and the upper surface of film 4a is maintained at about 0.2 $\mu$m. Additional details about this interface are available from IPEC.

Spectrometer 15 in this embodiment is configured as shown in FIG. 7, and is manufactured by Filmetrics, Inc., San Diego, Calif., the assignee of the subject application. In this spectrometer, the photodiode array 28 is manufactured by Hamamatsu, Part No. 3923-512Q, and the diffraction grating 25 is manufactured by Optometrics, Ayer, Mass., Part No. 33-4350. The spectrometer in this embodiment measures the intensity of the incoming light at 510 different wavelengths. These 510 different wavelengths are chosen depending on the desired measurement range. The following table correlates the wavelength range over which measurements are taken with the desired thickness measurement range:

| Wavelength Range | Thickness Measurement Range |
| --- | --- |
| 400–850 nm (visible) | 10 nm–20 $\mu$m |
| 650–1020 nm (near infrared) | 50 nm–50 $\mu$m |
| 400–1020 nm | 10 nm–50 $\mu$m |
| 215–670 nm (ultraviolet) | 3 nm–10 $\mu$m |
| 215–1020 nm | 3 nm–50 $\mu$m |

The photodiode array has 510 individual photodiode receptors, and integrates the current generated by the reflected light on each of the plurality of receptors. After a user-selectable integration time, the accumulated charge in each photodiode is read by the computer. The integration time determines the sensitivity of the spectrometer. Too short an integration time results in a weak, noisy signal, while too long of an integration time results in a saturated signal. Adjustment of the integration time to a suitable level is possible during a set-up mode.

Due to current leakage inherent to photodiodes, each photodiode in the array charges up even when no light enters the spectrometer. In order to accurately measure the light entering the spectrometer, this "dark" reading must be subtracted from the actual measured light. To obtain this "dark" reading, the light source 11 can be momentarily turned off. The digitized output of the spectrometer as read by the computer then constitutes this "dark" reading.

The computer 15 in this embodiment is a Pentium-based 100 MHz or faster computer running Windows 95 or a later Windows platform. A parallel port is required for interfacing to the spectrometer. At least 5 MB of hard disk and 8 MB free memory are required.

Software which embodies the subject invention and which is executable by the computer is available in a variety of computer-readable media, including CD-ROM, floppy disk, and the like.

The computer is configured with a visual display. In operation, the status of all four CMP stations are displayed simultaneously. With reference to FIG. 18, which illustrates a representative display of this status, an elapsed timer counter for each of the stations (referred to in the figures as "heads") is displayed. An indication of whether a head is active or not is also displayed. If a head is active, its corresponding elapsed time counter is continuously updated.

If a time is displayed in bold type (such as the time for head #2 in FIG. 18), that signifies that an endpoint for the head has been detected. The endpoint signal (the signal Q(t) described previously) or spectral information for one of the heads (the signal PSD(d), R(z), or R($\lambda$)) can be viewed by selecting the head of interest using the option buttons in the top part of the screen of FIG. 18.

FIGS. 19(*a*)–19(*d*) are examples of the types of graphical displays which are possible. FIG. 19(*a*) represents a graph of intensity data, R, as a function of $\lambda$ for an $S_iO_2$ film on a Si substrate. The estimated thickness of the film, 1573.83 nm, is also displayed.

FIG. 19(*b*) represents a graph of intensity data R as a function of $\lambda$ for an $S_iO_2$ film on a $S_i$ substrate. Again, the estimated thickness of the film, 624.86 nm, is also displayed.

FIG. 19(*c*) is a graph of PSD(d) for a structure comprising a 2000 nm $S_iO_2$ film on top of a 70 nm $S_{i3}N_4$ film, on top of a $S_i$ substrate. As can be seen, two peaks corresponding to the thickness of the two films, are clearly visible.

FIG. 19(*d*) is a graph of the endpoint signal or parameter Q(t) for a structure in which a topmost metal layer is or was removed.

Two methods of analysis methods are available to detect an endpoint: threshold and adaptive. According to the analysis method, the endpoint signal Q(t) described earlier is observed, and the condition detected when the data has exceeded a user-supplied threshold value. In the adaptive method of analysis, the data at a given time is compared with several seconds of immediately-preceding data, and an endpoint condition detected when a peak in the data is detected followed by several seconds of relatively constant data.

A set-up mode is provided in which a user is able to select the desired method of endpoint detection, and the parameters specific to each method, such as threshold level in the case of the threshold method, and the number of smoothing points in the case of the adaptive method. The set-up mode also provides an opportunity for a user to select whether automatic dark subtraction is desired, and the desired level of integration time for the individual photodiode receptors of the spectrometer.

The computer is also configured to determine and display the refractive index n of a material as a function of $\lambda$. Such a procedure is illustrated in FIG. 19, which is a plot of the measured values of n for a film of $S_iO_2$ as a function of $\lambda$. This data is then used to determine R(z) from the data obtained from the spectrometer.

The values of n which are measured can then be stored for later use. To access these values in the future, a user would indicate the structure of a sample under tests, e.g., $S_iO_2$ on $S_i$ to indicate an $S_iO_2$ film on a silicon substrate. The computer would then access the appropriate values of n using this information, and determine R(z) therefrom. FIG. 21 is a graphical display indicating a user-specified structure of PTFE on $S_i$. The data R($\lambda$) for this sample, as measured by the spectrometer, is also displayed. A table showing a value of n for PTFE for a specific value of $\lambda$ is also displayed. This data is used to compute R(z).

In this embodiment, the code responsible for computing the Fourier transform of the R(z) data comprises two code modules, listed below. The first code module calls the second code module during operation.

First Code Module

```
#include<math.h>
void realft(float data[ ], unsigned long n, int isign)
Calculates the Fourier transform of a set of n real-valued
data points. Replaces this data (which is stored in array
data [1 . .n] by the positive frequency half of its complex
Fourier transform. The real-valued flrst and last
components of the complex transform are returned as
elements data [1] and data [2], respectively. n must be a
power of 2. This routine also calculates the inverse
transform of a complex data array if it is the transform
of real data. (Result in this case must be multiplied by
2/n.)
{
      void four1(flat data[ ], unsigned long nn, int
isign);
      unsigned long i, i1, i2, i3, i4, np3;
      float c1=0.5,c2,h1r,h1i,h2r,h2i;
      double wr,wi,wpr,wpi,wtemp,theta;

theta =3.141592653589793/(double) (n>>1);   Double precision for the
      if(isign == 1) {                             trigonometric recurrences.
            c2 = -0.5;                             Initialize the recurrence.
            four1 (data,n>>1,1);
      } else {                                     The forward transform is here.
            c2 = 0.5;
            theta = -theta;                        Otherwise set up for an inverse
      }                                            transform.
      wtemp=sin)0.5*theta);
      wpr = 2.0*wtemp*wtemp;
      wpi=sin(theta);
      wr=1.0+wpr;
      wi=wpi;
      np3=n+3
      for(i+2;i<=(n>>2);i++) {
            i4=1+(i3=np3-(i2=1+(i1=i+i-1)));
            h1r=c1*(data[i1]+data[i3]);            Case i=1 done separately below.
            h1i=c1*(data[i2]-data[i4]);
            h2i=c2*(data[i1]-data[i3]);            The two separate transforms are
            data[i1]=h1r+wr*h2r-wi*h2i;            separated out of data.
            data[i2]=h1i+wr*h2i+wi*h2r;
            date[i3]=h1r-wr*h2r+wi*h2i;
            data[i4]=-h1I+wr*h2i+wi*h2r;           Here they are recombined to form the
            wr=(wtemp=wr)*wpr-wi*wpi+wr;           true transform of the original real data.
            wi=wi*wpr+wtemp*wpi+wi;
      }                                            The recurrence.
      if(isign == 1) {
            data[1] = (h1r=data[1]+data[2];
            data[2] = h1r-data[2];
```

-continued

```
} else {
    data[1]=c1*((h1r=data[1]+data[2]);     Squeeze the first and last data together
    data[2]=c1*(h1r-data[2]);              to get them all within the original
    four1(data,n>>1,-1);                   array.
}
                                           This is the inverse transform for the
                                           case isign=-1.
```

Second Code Module

```
#include<math.h>
#define SWAP(a,b) tempr=(a); (a)=(b);      Double precision for the trigonometric
(b)=tempr                                  recurrences.
void flour1(float data[ ], unsigned long nn,int
isign)
Replaces data [1..2*nn]by its discrete Fourier    This is the bit reversal section of the
transform, if isign is input as 1; or replaces data    routine.
[1..2*nn] by nn times its inverse discrete Fourier    Exchange the two complex
                                                      numbers
transform, if isign is input as - 1.
data is a complex array of length nn or,
equivalently, a real array of length 2*nn. nn
MUST be an integer power of 2 (this is not
checked for!).
{
    unsigned long.n,mmax,m,j,istep,i;
    double wtemp,wr,wpr,wpi,wi,theta;
    float tempr,tempi;
                                           Here begins the Danielson-Lanczos
    n=nn<<1;                                 section of the routine.
    j=1;                                   Outer loop executed log$_2$nn times.
    for (i=1;i<n;i+=2) {
        if (j > i) {                       Initialize the trigonometric recurrence.
            SWAP(data[j],data[i]);
            SWAP(data[j + 1],data[i + 1]);
        }
m=n>>1;
while(m>=2&&j>m) {
        j-=m;
        m>>=1;
    }
    j + =m;
}
mmax=2;
while (n>mmax) {
    istep=mmax<<1;
    theta=isign*(6.28318530717959/mmax);
    wtemp=sin(0.5*theta);
    wpr=-2.0*wtemp*wtemp;
    wpi=sin(theta);
    wr=1.0;
    wi=0.0;
        for (m=1;m<mmax;m+=2) {            Here are the two nested inner 100P5
          for (i=m;i<=n;i+=istep) {
            =i+mmax;                       This is the Danielson-Lanczos
            tempr=wr*data[j]wi*data[j+1];  formula:
            tempi=wr*data[j+1]+wi*data[j];
            data[j]=data[i]-tempr;
            data[j+1]=data[i+1]-tempi;
            data[i]+=tempr;
            data[i+1]+=tempi;
}
wr=(wtemp=wr)*wpr-wi*wpi+wr;
wi=wi*wpr+wtemp*wpi+wi;               Trigonometric reference.
}
        mmax=istep
    }
}
```

Listings of these programs are provided at pages 507 and 513 of the Press reference previously incorporated by reference.

The output of these programs is the data FT(d) described previously. From this data, the PSD(d) data is derived in accordance with the relationship defined above in equation (3).

The spectral data which results is a signal ranging from 0 to 4095 counts. Because of the effects described earlier in relation to equation (4), the shape of the spectral data will vary from one head to the next even if the sample under evaluation is the same.

To account for this, during the set-up mode, a baseline spectra is obtained and stored in the system. As discussed, this baseline data is used to normalize the spectral information which is captured during the active phase of operation. This is a critical requirement in the computation of the endpoint signal Q(t).

It has been found that this embodiment yields a thickness accuracy of ±1 nm at a 200 nm film thickness. The precision obtained, defined as the average standard deviation over twenty successive days of 100 thickness readings of 500 nm $S_iO_2$ film on a silicon substrate, was 0.1 nm. It was found that this value is repeatable at a level of 0.07 nm.

Additional advantages and modifications will readily occur to those of skilled in the art. The invention in the broader aspects is not, therefore, limited to the specific details, representative methods, and illustrative examples shown and described. Accordingly, departures may be made from such details without departing from the spirit or scope of applicant's general inventive concept.

What is claimed is:

1. An end point detection apparatus comprising:
a white light source configured to generate a light signal;
a first fiber optic cable connected to said light source to receive said light signal and further configured to direct said light signal onto a sample, said light signal reflecting from said sample to create a reflected light signal having a plurality of wavelength components, each having an intensity;
a second fiber optic cable positioned to receive said reflected light signal;
a spectrometer configured to receive said reflected light signal from said second fiber optic cable, and determine therefrom a plurality of electrical signals, each representative of the intensity of a wavelength component of the reflected light;
a computer programmed to receive from said spectrometer said plurality of electrical signals, and determine therefrom the presence of an endpoint condition for at least one film included in said sample, the film comprising a material having a refractive index, by:
obtaining data representative of the intensity of at least some of said wavelength components;
arranging said data so that it is a function of a variable equal to the refractive index of the material divided by wavelength;
normalizing said data using a reference spectrum;
determining the Power Spectral Density of the normalized data as a function of potential layer thickness;
integrating the Power Spectral Density over potential layer thickness to obtain an endpoint parameter;
detecting a transition in the endpoint parameter; and
detecting the presence of the endpoint condition from the transition.

2. The apparatus of claim 1 further comprising a CMP station for processing the film.

3. An end point detection apparatus comprising:
a light source configured to generate a light signal;
a first optical director configured to receive said light signal and direct said light signal onto a sample during processing to obtain a reflected light signal having a plurality of wavelength components, each having an intensity;
a second optical director positioned to receive said reflected light signal;
an optical device configured to receive said reflected light signal from said second director, and derive therefrom a plurality of electrical signals, each representative of the intensity of a wavelength component of the reflected light;
an electronic device configured to receive said plurality of electrical signals and convert them to numeric representations of the intensity of each detected wavelength component;
a computer programmed to receive said plurality of numeric representations, and detect therefrom an endpoint condition of at least one film included in said sample by:
obtaining data representative of the intensity of at least some of said wavelength components;
performing analysis on said data to obtain thickness spectral data as a function of potential layer thickness;
integrating the thickness spectral data over a range of potential layer thicknesses to obtain an endpoint parameter;
detecting a transition in the endpoint parameter; and
detecting the endpoint condition from the transition of the endpoint parameter.

4. The apparatus of claim 3 further comprising a CMP station for processing the film, wherein the computer is programmed to signal the CMP station upon detecting the presence of the endpoint condition.

5. An endpoint detection apparatus comprising:
a first means for directing a light signal onto a sample during processing to obtain a reflected light signal having a plurality of wavelength components, each having an intensity;
second means for receiving said reflected light signal and deriving therefrom data representative of the intensity of at least some of the wavelength components of the reflected light;
third means for performing analysis of said data to obtain thickness spectral data;
fourth means for deriving an endpoint parameter from said thickness spectral data; and
fifth means for detecting a transition of the endpoint parameter and detecting therefrom an endpoint condition of a film included within the sample.

6. A computer program medium embodying a program of instructions executable by a computer to perform a method for detecting an endpoint condition for at least one film included within a sample from light reflected from the sample having a plurality of wavelength components, each having an intensity, and the film comprising a material having a refractive index, the method comprising the following steps:
obtaining data representative of the intensity of at least some of said wavelength components;
arranging said data so that it is a function of a variable equal to the refractive index of the material divided by wavelength;

normalizing said data using a reference spectrum;

determining the Power Spectral Density of the normalized data as a function of potential layer thickness;

integrating the Power Spectral Density over a range of potential layer thicknesses to obtain an endpoint parameter;

detecting a transition in the endpoint parameter; and detecting the endpoint condition from the transition.

7. A computer program medium embodying a program of instructions executable by a computer to perform a method for detecting an endpoint condition for at least one film included within a sample from light reflected from the sample having a plurality of wavelength components, each having an intensity, the method comprising the following steps:

obtaining data representative of the intensity of at least some of said wavelength components;

performing analysis on said data to obtain thickness spectral data as a function of potential layer thickness;

integrating the thickness spectral data over a range of potential layer thicknesses to obtain an endpoint parameter;

detecting a transition in the endpoint parameter; and detecting the endpoint condition from the transition.

8. A computer program medium embodying a program of instructions executable by a computer to perform a method for detecting an endpoint condition for at least one film included within a sample from light reflected from the sample having a plurality of wavelength components, each having an intensity, the method comprising the following steps:

obtaining data representative of the intensity of at least some of the wavelength components of the reflected light;

performing analysis of said data to obtain thickness spectral data;

deriving an endpoint parameter from said thickness spectral data;

detecting a transition of the endpoint parameter; and detecting the endpoint condition from said transition of said endpoint parameter.

9. A method for detecting an endpoint condition for at least one film included within a sample from light reflected from the sample having a plurality of wavelength components, each having an intensity, and the film comprising a material having a refractive index, the method comprising the following steps:

obtaining data representative of the intensity of at least some of said wavelength components;

arranging said data so that it is a function of a variable equal to the refractive index of the material divided by wavelength;

normalizing said data using a reference sample;

determining the Power Spectral Density of the normalized data as a function of potential layer thickness;

integrating the Power Spectral Density over potential layer thickness to obtain an endpoint parameter;

detecting a transition in the endpoint parameter; and detecting the endpoint condition for the film from the transition.

10. A method for detecting an endpoint condition for at least one film included within a sample from light reflected from the sample having a plurality of wavelength components, each having an intensity, the method comprising the following steps:

obtaining data representative of the intensity of at least some of said wavelength components;

performing analysis on said data to obtain thickness spectral data as a function of potential layer thickness;

integrating the spectral data over a range of potential layer thicknesses to obtain an endpoint parameter;

detecting a transition in the endpoint parameter; and detecting the endpoint condition from the transition.

11. The method of claim 10 further comprising processing the film using a CMP processing station, and signaling the CMP station upon detecting the endpoint condition.

12. The method of claim 10 in which the performing step includes deriving the Fourier Transform of the intensity data.

13. The method of claim 10 in which the performing step includes deriving the Power Spectral Density of the intensity data.

14. The method of claim 10 further comprising the step of processing the film from the CMP station during the foregoing steps.

15. A method for detecting an endpoint condition for at least one film included within a sample from light reflected from the sample having a plurality of wavelength components, each having an intensity, the method comprising the following steps:

obtaining data representative of the intensity of at least some of the wavelength components of the reflected light;

performing analysis of said data to obtain thickness spectral data;

deriving an endpoint parameter from said thickness spectral data;

detecting a transition of the endpoint parameter; and detecting the endpoint condition from said transition of said endpoint parameter.

* * * * *